US012052266B2

United States Patent
Moon et al.

(10) Patent No.: US 12,052,266 B2
(45) Date of Patent: Jul. 30, 2024

(54) SECURE STREAMING MEDIA BASED ON UPDATING HYPERCONTENT IN A SECURE PEER-TO-PEER DATA NETWORK

(71) Applicant: WhiteStar Communications, Inc., Durham, NC (US)

(72) Inventors: Billy Gayle Moon, Apex, NC (US); Fabian Reddig, Mebane, NC (US); Aaron Daniel Fleshner, Durham, NC (US)

(73) Assignee: WhiteStar Communications, Inc., Durham, NC (US)

( * ) Notice: Subject to any disclaimer, the term of this patent is extended or adjusted under 35 U.S.C. 154(b) by 227 days.

(21) Appl. No.: 17/552,586

(22) Filed: Dec. 16, 2021

(65) Prior Publication Data

US 2023/0199001 A1     Jun. 22, 2023

(51) Int. Cl.
*H04L 65/1069*     (2022.01)
*H04L 9/40*     (2022.01)
(Continued)

(52) U.S. Cl.
CPC ........ *H04L 63/123* (2013.01); *H04L 63/1425* (2013.01); *H04L 65/1069* (2013.01);
(Continued)

(58) Field of Classification Search
CPC ............... H04L 63/123; H04L 63/1425; H04L 63/0428; H04L 65/1069; H04L 65/1083;
(Continued)

(56) References Cited

U.S. PATENT DOCUMENTS 7,792,989 B2    9/2010   Toebes et al.
7,818,607 B2    10/2010  Turner et al.
(Continued)

OTHER PUBLICATIONS

Society video, "Society Secure Messenger: The world's most secure way to chat", Text and Screenshots, (Mar. 10, 2020), [online], [Retrieved on Mar. 3, 2022]. Retrieved from the Internet: URL: <https://www.youtube.com/watch?v=jSRmnseSCVA>, 9 pages.

(Continued)

*Primary Examiner* — Alina A Boutah
(74) *Attorney, Agent, or Firm* — Leon R. Turkevich

(57) ABSTRACT

A secure peer-to-peer streaming media session is initiated in a secure data network based on a secure executable container executed by an endpoint device receiving a request, by an originating entity, for initiating the session with a second network entity having a two-way trusted relationship with the endpoint device in the secure data network via a second network device. The secure executable container: generates a conversation object identifying the second network entity as a participant in the session, and causes secure autonomic synchronization of the conversation object with the second network device; generates a message object and adds a reference to the conversation object; and updates a hypercontent body in the message object with streaming media data received from an executable media source in the endpoint device. The updating causes the second network device to retrieve each update of the streaming media data in the hypercontent body during the session.

20 Claims, 11 Drawing Sheets

(51) Int. Cl.
*H04L 65/1083* (2022.01)
*H04L 65/1104* (2022.01)
*H04L 65/60* (2022.01)
*H04L 67/104* (2022.01)

(52) U.S. Cl.
CPC ...... *H04L 65/1083* (2013.01); *H04L 65/1104* (2022.05); *H04L 65/60* (2013.01); *H04L 67/104* (2013.01)

(58) Field of Classification Search
CPC ... H04L 65/1104; H04L 65/60; H04L 65/403; H04L 67/104
See application file for complete search history.

(56) References Cited

U.S. PATENT DOCUMENTS

| | | | |
|---|---|---|---|
| 2008/0022091 A1* | 1/2008 | Deshpande | H04L 63/0869 713/157 |
| 2016/0119412 A1* | 4/2016 | Gouge | H04N 21/26258 713/168 |
| 2017/0142180 A1* | 5/2017 | McGowan | H04L 65/1069 |
| 2018/0239560 A1* | 8/2018 | Venetsanopoulos | G06F 3/0643 |
| 2018/0343488 A1* | 11/2018 | Amento | H04L 65/1069 |
| 2019/0058645 A1* | 2/2019 | Kellicker | H04L 43/08 |
| 2019/0089756 A1* | 3/2019 | Wissingh | H04N 21/44209 |
| 2020/0028836 A1* | 1/2020 | Gandhi | H04L 63/062 |
| 2021/0026535 A1 | 1/2021 | Moon | |
| 2021/0026976 A1 | 1/2021 | Moon | |
| 2021/0028940 A1 | 1/2021 | Moon | |
| 2021/0028943 A1 | 1/2021 | Moon | |
| 2021/0029092 A1 | 1/2021 | Moon | |
| 2021/0029125 A1 | 1/2021 | Moon | |
| 2021/0029126 A1 | 1/2021 | Moon | |
| 2021/0044854 A1* | 2/2021 | Amento | H04N 21/41422 |
| 2021/0081524 A1 | 3/2021 | Moon | |
| 2022/0021912 A1* | 1/2022 | Ramaley | H04N 21/472 |
| 2022/0385644 A1* | 12/2022 | Puzeris | G06F 21/445 |
| 2023/0033192 A1 | 2/2023 | Sutherland et al. | |
| 2023/0076196 A1* | 3/2023 | Kumar | G06N 3/0475 |
| 2023/0367836 A1* | 11/2023 | Sundberg | G06F 21/53 |

OTHER PUBLICATIONS

Society video, "Complete AI Security", Text, Transcript, and Screenshots, (Mar. 19, 2020), [online], [Retrieved on Mar. 3, 2022]. Retrieved from the Internet: URL: <https://www.youtube.com/watch?v=5U2khXXcDMo>, 16 pages.

Society video, "Society's Best in Class Security and the Cohort System", Text, Transcript, and Screenshots, (Mar. 26, 2020), [online], [Retrieved on Mar. 3, 2022]. Retrieved from the Internet: URL: <https://www.youtube.com/watch?v=dwUlktWMMoc>, 11 pages.

Society video, "Society Tutorial 6 : Advanced Controls", Transcript and Screenshots, (Apr. 6, 2020), [online], [Retrieved on Mar. 3, 2022]. Retrieved from the Internet: URL: <https://www.youtube.com/watch?v=5jIVTcQmADw>, 5 pages.

Society video, "Society Tutorial 5: Conversation Controls", Transcript and Screenshots, (Apr. 6, 2020), [online], [Retrieved on Mar. 4, 2022]. Retrieved from the Internet: URL: <https://www.youtube.com/watch?v=v6uDbsFPqhc>, 11 pages.

Society video, "Creating a Conversation", Transcript and Screenshots, (Apr. 6, 2020), [online], [Retrieved on Mar. 4, 2022]. Retrieved from the Internet: URL: <https://www.youtube.com/watch?v=irvX9ZyaPLM>, 4 pages.

Society video, "Society Tutorial Part 7 : Notifications and Misc", Transcript and Screenshots, (Apr. 6, 2020), [online], [Retrieved on Mar. 4, 2022]. Retrieved from the Internet: URL: <https://www.youtube.com/watch?v=muxTsR1PvZA>, 7 pages.

Society video, "Society Tutorial 1: Setting Up and Making a Connection", Transcript and Screenshots, (Jun. 29, 2020), [online], [Retrieved on Mar. 4, 2022]. Retrieved from the Internet: URL: <https://www.youtube.com/watch?v=4k8cYbv-Of0>, 15 pages.

"4-Way Handshake", Jan. 24, 2019, [online], [retrieved on Jun. 1, 2021]. Retrieved from the Internet: URL: https://www.wifi-professionals.com/2019/01/4-way-handshake>, pp. 1-21.

Thubert, Ed., et al., "Address Protected Neighbor Discovery for Low-Power and Lossy Networks", [online], 6lo Internet Draft, Feb. 23, 2018, [retrieved on Oct. 30, 2018]. Retrieved from the Internet: URL: <https://tools.ietf.org/pdf/draft-ietf-6lo-ap-nd-06.pdf>, pp. 1-22.

Lehembre, "Wi-Fi-security—WEP, WPA and WPA2", Jun. 2005, [online], [retrieved on Jun. 1, 2021]. Retrieved from the Internet: URL: <http://tele1.dee.fct.unl.pt/rit2_2015_2016/files/hakin9_wifi_EN.pdf>, 14 pages.

Leach et al., "A Universally Unique IDentifier (UUID) URN Namespace", Network Working Group, Request for Comments: 4122, Jul. 2005, [online], [retrieved on May 20, 2021]. Retrieved from the Internet: URL: <https://www.rfc-editor.org/rfc/pdfrfc/rfc4122.txt.pdf>, pp. 1-32.

Winter, Ed., et al., "RPL: IPV6 Routing Protocol for Low-Power and Lossy Networks", Internet Engineering Task Force (IETF), Request for Comments: 6550, Mar. 2012, pp. 1-157.

Thubert, Ed., et al., "Registration Extensions for IPv6 over Low-Power Wireless Personal Area Network (6LoWPAN) Neighbor Discovery", [online], Internet Engineering Task Force (IETF), Request for Comments: 8505, Nov. 2018, [retrieved on Nov. 16, 2018]. Retrieved from the Internet: <https://tools.ietf.org/pdf/rfc8505.pdf>, pp. 1-47.

Wikipedia, "Pretty Good Privacy", May 16, 2021, [online], [retrieved on Jul. 22, 2021]. Retrieved from the Internet: URL: <https://en.wikipedia.org/w/index.php?title=Pretty_Good_Privacy&oldid=1023418223>, pp. 1-8.

Arends et al., "DNS Security Introduction and Requirements", Network Working Group, Request for Comments: 4033, Mar. 2005, [online], [retrieved on Sep. 14, 2021]. Retrieved from the Internet: URL: <https://www.rfc-editor.org/rfc/pdfrfc/rfc4033.txt.pdf>, pp. 1-21.

Callas et al., "OpenPGP Message Format", Network Working Group, Request for Comments: 4880, Nov. 2007, [online], [retrieved on Oct. 28, 2021]. Retrieved from the Internet: URL: <https://www.rfc-editor.org/rfc/pdfrfc/rfc4880.txt.pdf>, pp. 1-90.

Moon, U.S. Appl. No. 17/345,057, filed Jun. 11, 2021.
Moon, U.S. Appl. No. 17/477,208, filed Sep. 16, 2021.
Moon, U.S. Appl. No. 17/382,709, filed Jul. 22, 2021.
Moon, U.S. Appl. No. 17/343,268, filed Jun. 9, 2021.
Moon, U.S. Appl. No. 17/388,162, filed Jul. 29, 2021.
Moon, U.S. Appl. No. 17/532,740, filed Nov. 22, 2021.

Schulzrinne et al., "RTP: A Transport Protocol for Real-Time Applications", Network Working Group, Request for Comments: 3550, Jul. 2003, [online], [retrieved on Dec. 13, 2021]. Retrieved from the Internet: URL: <https://www.rfc-editor.org/rfc/rfc3550.pdf>, pp. 1-89.

Zoom, Video Conferencing, Cloud Phone, Webinars, Chat, Virtual Events | Zoom, [online], [retrieved on Dec. 6, 2021]. Retrieved from the Internet: URL: <https://zoom.US/>, pp. 1-4.

* cited by examiner

SECURE STREAMING MEDIA BASED ON UPDATING HYPERCONTENT IN A SECURE PEER-TO-PEER DATA NETWORK

STATEMENT REGARDING PRIOR DISCLOSURES BY THE INVENTOR OR A JOINT INVENTOR

The following U.S. Patent Publications do not qualify as prior art under 35 USC 102(b)(1)(A) because their Jan. 28, 2021 publications are (1) one year or less before the effective filing date of the claimed invention, and (2) by the inventor or a joint inventor: U.S. Pub. 2021/0026535; U.S. Pub. 2021/0026976; U.S. Pub. 2021/0028940; U.S. Pub. 2021/0028943; U.S. Pub. 2021/0029092; U.S. Pub. 2021/0029125; and U.S. Pub. 2021/0029126, the disclosures all of which are incorporated herein by reference to the extent not inconsistent with this application.

TECHNICAL FIELD

The present disclosure generally relates to secure streaming media based on updating hypercontent in a secure peer-to-peer data network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

The Internet Protocol (IP) has enabled the Internet to evolve from a set of connected research institutions and universities to a world wide web of connected IP devices that enables worldwide communications between user-controlled devices ("user devices"), Internet of Things (IoT) devices (devices that do not require user control), and server devices providing ever-increasing cloud-based based services such as social networking services, business transaction services, media distribution services, data storage services, etc. The enormous success of the Internet is based on the deployment of IP routing protocols that enable a "source" device (having a corresponding "source IP address") that is connected to the Internet to reach a "destination" device (having a corresponding "destination IP address") that also is connected to the Internet.

This universal reachability also has introduced severe security threats to each and every IP device that is connected to the Internet, because any "threat device" originating at a "source" IP address (e.g., a malfunctioning network device infected by malware or a network device operated by a malicious user) can threaten any "target device" at a "destination" IP address in an attempt to steal private data, disrupt the target device, etc. Hence, this universal reachability has resulted in losses on the order of billions (or even trillions) of dollars in losses due to attacks on targeted devices, including attacks on personal devices, as well as attacks on large-scale corporate, government, and/or military networks. Individuals and institutions collectively have expended billions of dollars in network security in an attempt to thwart or mitigate against online attacks, yet malicious users still have been able to overcome network security attempts.

Additional security risks have been encountered based on reliance on cloud-based services, including server-based video or audio calling services such as videoconferencing, audio-conferencing, etc. Existing video-based conferencing services such as "Zoom" rely on a cloud-based meeting server to manage the "call" (i.e., conferencing service), including creating the call, connecting the participants, optionally recording the call, and terminating the call. Reliance on a cloud-based meeting server, however, exposes the conferencing services to substantial security risks due to the relatively large attack surface area provided by the numerous IP addresses utilized by the cloud-based conferencing services; moreover, the reliance on a cloud-based meeting server exposes the calling services to potential privacy threats, including data mining, eavesdropping, and deplatforming, etc.

In addition, proprietary video-messaging systems (e.g., the commercially-available "FaceTime" by Apple Inc.) typically are limited to two-way video messaging between only two parties that are required to use the same type of device (e.g., same device manufacturer). Hence, users of other device types (e.g., Android-based devices) are unable to utilize such proprietary video-messaging systems.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
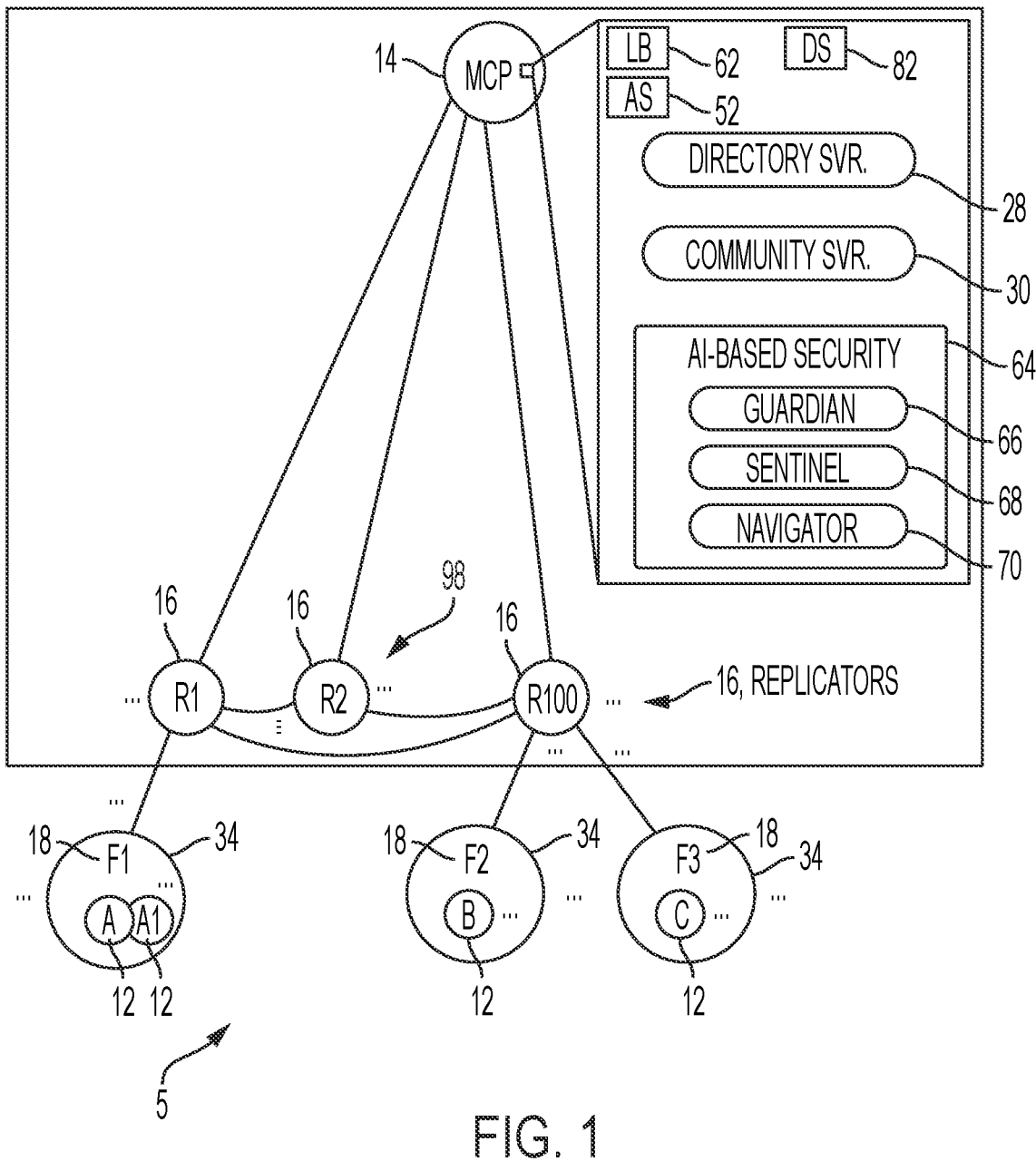
FIG. 1 illustrates a secure peer-to-peer data network comprising an apparatus causing secure peer-to-peer streaming media sessions in a secure peer-to-peer data network, according to an example embodiment.

In one embodiment, a method comprises: receiving, by a secure executable container executed by an endpoint device, a request by an originating entity for initiating a secure peer-to-peer streaming media session with at least a second network entity in a secure data network, the secure executable container having established a two-way trusted relationship between the originating entity and the endpoint device in the secure data network and a corresponding two-way trusted relationship between the endpoint device and a second network device of the second network entity; generating, by the secure executable container in response to the request, a first data object identifying the second network entity as a participant in the secure peer-to-peer streaming media session, and causing a secure autonomic synchronization of the first data object with the second network device; generating, by the secure executable container, a message object and adding a corresponding reference of the message object to the first data object; and updating, by the secure executable container, a hypercontent body in the message object with streaming media data received from an executable media source in the endpoint device, the updating including causing the second network device to retrieve each update of the streaming media data in the hypercontent body during the secure peer-to-peer streaming media session.

In another embodiment, one or more non-transitory tangible media are encoded with logic for execution by a machine and when executed by the machine operable for: receiving, by a secure executable container executed by the machine as an endpoint device, a request by an originating entity for initiating a secure peer-to-peer streaming media session with at least a second network entity in a secure data network, the secure executable container having established a two-way trusted relationship between the originating entity and the endpoint device in the secure data network and a corresponding two-way trusted relationship between the endpoint device and a second network device of the second network entity; generating, by the secure executable container in response to the request, a first data object identifying the second network entity as a participant in the secure peer-to-peer streaming media session, and causing a secure autonomic synchronization of the first data object with the second network device; generating, by the secure executable container, a message object and adding a corresponding reference of the message object to the first data object; and updating, by the secure executable container, a hypercontent body in the message object with streaming media data received from an executable media source in the endpoint device, the updating including causing the second network device to retrieve each update of the streaming media data in the hypercontent body during the secure peer-to-peer streaming media session.

In another embodiment, an apparatus is implemented as a physical machine, the apparatus comprising: non-transitory machine readable media configured for storing executable machine readable code; a device interface circuit; and a processor circuit. The processor circuit is configured for executing the machine readable code as a secure executable container, and when executing the machine readable code operable for: receiving, by the apparatus implemented as an endpoint device, a request by an originating entity for initiating a secure peer-to-peer streaming media session with at least a second network entity in a secure data network, the secure executable container having established a two-way trusted relationship between the originating entity and the endpoint device in the secure data network and a corresponding two-way trusted relationship between the endpoint device and a second network device of the second network entity; generating, in response to the request, a first data object identifying the second network entity as a participant in the secure peer-to-peer streaming media session, and causing via the device interface circuit a secure autonomic synchronization of the first data object with the second network device; generating a message object and adding a corresponding reference of the message object to the first data object; and updating a hypercontent body in the message object with streaming media data received from an executable media source in the endpoint device, the updating including causing the second network device to retrieve each update of the streaming media data in the hypercontent body during the secure peer-to-peer streaming media session.

DETAILED DESCRIPTION

Particular embodiments enable secure and scalable presentation of streaming media between an originating entity and one or more "participant" network entities in a secure peer-to-peer streaming media session via a secure peer-to-peer data network. The example embodiments enable the secure peer-to-peer streaming media session to be implemented as a multicast session comprising a single media stream originating from the originating entity and destined for the one or more participant network entities; the secure peer-to-peer streaming media session also can be implemented as a "video chat", an audioconference, or a videoconference between two or more participant network entities, where each participant entity can generate and output a corresponding media stream to the other participant entities.

According to example embodiments, a secure executable container executed in each endpoint device that communicates via the secure peer-to-peer data network ensures that the entity or "user" of the endpoint device has established two-way trusted relationship with the endpoint device in the secure peer-to-peer data network; the secure executable container also establishes secure peer-to-peer communications based on establishing a corresponding two-way trusted relationship with each of a plurality of other endpoint devices, including reception of secure public keys generated by the other endpoint devices, for generation of secure data packets using the secure public keys for secure peer-to-peer communications. Hence, the secure executable container can enforce security in the secure peer-to-peer data network, preventing any intermediate device from any unauthorized access of any data (including any streaming media data).

The secure executable container in the endpoint device of an originating entity (also referred to as an "originating endpoint device" or an "originating device") can initiate or establish a secure peer-to-peer streaming media session based on generating a first data object (also referred to as a "conversation" object) that identifies participants of the secure peer-to-peer streaming media session, and that further identifies any message objects associated with the secure peer-to-peer streaming media session. The originating endpoint device can cause a secure autonomic synchronization of the first data object with each of the participants, as each participant device has established a corresponding two-way trusted relationship with the originating endpoint device.

Any one or more of the message objects referenced in the first data object can include a hypercontent body that is updated in response to the secure executable container receiving a "chunk" of streaming media data (e.g., one or more Real-time Transport Protocol (RTP) packets). Hence, the secure executable container can respond to receiving a streaming media data chunk by updating (i.e., overwriting) a hypercontent body in a message object with the received streaming media data chunk. The secure executable container can cause a participant device of each participant identified in the first data object to autonomically retrieve the updated message object containing the received streaming media data chunk that is stored in the updated hypercontent body. Additional message objects referenced in the first data object can include other message types, for example "stream control" for control-plane based call control metadata describing call controls for the secure peer-to-peer streaming media session, or for call control metadata describing a call status for each participant. Additional messages referenced in the first data object can include documents or images presented or shared as part of the secure peer-to-peer streaming media session, for concurrent presentation with the one or more media streams.

Hence, the example embodiments enable "live" or "near-live" secure peer-to-peer video "calls" or "chat sessions", and/or live or near-live secure peer-to-peer multiple-participant video conference sessions, in a secure and scalable manner that can be implemented by any network device, regardless of implementation or device manufacturer.

The example embodiments also enable the secure executable container in each participant device to enforce lifetime and distribution policies set by the secure executable container in the originating endpoint network device for the secure peer-to-peer streaming media session, including whether any data object is restricted to limited distribution (or can be exported outside the secure executable container of the destination network device for unrestricted storage and distribution).

A description will first be provided of a network operating system providing secure encryption and secure communications, followed by a description of the secure peer-to-peer data network, and a secure identity management system used to establish the two-way trusted relationships, followed by a description of the secure per-to-peer streaming media session in a secure peer-to-peer data network based on updating hypercontent in a data object.

Network Operating System

Any and all access to any data structures to or from an external network device, or any network-based services, is exclusively via a network operating system (56 of FIG. 3) in a secure peer-to-peer data network (5 of FIG. 1), and is based on the strict security enforcement by the network operating system 56 executed by any network device within the secure peer-to-peer data network, for example an endpoint device 12 controlled by a network entity (e.g., a user entity, an IoT-based entity, etc.), a replicator device 16 having a two-way trusted relationship with the endpoint device, and/or a core network device (e.g., 14) having a two-way trusted relationship with the replicator device. The network operating system 56, implemented within every network device in the secure peer-to-peer data network 5, provides exclusive access to the secure peer-to-peer data network 5; in other words, the network operating system (also referred to herein as a "secure executable container") prevents any executable resource in the corresponding network device from accessing any unencrypted form of any "at-rest" or "in-flight" secure data structures, or accessing the secure peer-to-peer data network, without authorized access via a prescribed Application Programming Interface (API) (80 of FIG. 3) required by the network operating system.

A fundamental problem with existing Internet technology is that the Internet was architected at the network layer (layer 3) with an Internet Protocol (IP) that merely routed data packets between a source device and a destination device, with no regard for anti-fraud protection, protecting user identities, etc. The worldwide deployment of the Internet using Internet Protocol at the network layer thus exposed network devices connected to the Internet to malicious attacks, unauthorized monitoring of user communications, and exploitation of user identities by service providers that have executed machine learning of user behaviors in order to identify targeted advertising to Internet users, including targeting addictive content.

Moreover, the use of Internet Protocol at the network layer, without any regard for anti-fraud protection or user identity protection at the network layer, resulted in implementing security-based network services (e.g., protecting owned content, building directories, building ontologies, providing security, etc.) "above" the layer 3 (network) layer, typically at the application layer; unfortunately, implementing security-based network services at the application layer cannot prevent a malicious user from reaching a target via the layer 3 Internet, especially since a malicious user often can bypass the OSI (Open Systems Interconnect) protocol stack using unencrypted "raw" data packets that can bypass a TCP/IP stack.

In contrast, the network operating system 56 according to example embodiments maintains exclusive control over all access to the secure peer-to-peer data network 5 and access to any data structure associated with the secure peer-to-peer data network 5, including any and all user metadata for any user accessing the secure peer-to-peer data network 5. Further, the network operating system 56 establishes an identity management system that requires a user to verify their identity upon initial registration in the secure peer-to-peer data network, and requires the user to establish a two-way trusted relationship with their endpoint device and any other network entity in the secure peer-to-peer data network 5.

Consequently, the network operating system 56 can provide secure communications between two-way trusted network devices in a secure peer-to-peer data network 5, where the secure peer-to-peer data network is established based on an aggregation of two-way trusted relationships.

Moreover, each network device can uniquely and securely identify itself based on its network operating system 56 cryptographically generating a secure private key and a corresponding secure public key. Hence, data storage in each and every network device in the secure peer-to-peer data network 5, as well as all network communications between each and every network device, can be secured based on sharing secure public keys between endpoint devices having established a two-way trusted relationship based on a secure verification of membership within the same "federation" according to a prescribed secure salutation protocol.

The secure storage and transmission of data structures can be extended between different "federations" of endpoint devices (established by different users having established respective two-way trusted relationships with the secure peer-to-peer data network), based on the different users establishing their own two-way trusted relationship according to the prescribed secure salutation protocol.

Secure Private Core Network Overview

FIG. 1 illustrates a secure peer-to-peer data network 5 comprising an example secure private core network 10, according to an example embodiment. The secure private core network 10 is: a (1) cloudless (2) hybrid peer-to-peer overlay network that (3) can utilize artificial intelligence (AI) to extend security features and operations beyond end-to-end encryption between two endpoint devices 12, for example wireless smartphone devices, wireless smart tablet devices, wireless Internet of Things (IoT) devices, etc. The secure private core network 10 comprises a master control program (MCP) device 14, and one or more replicator devices (e.g., "R1") 16. Each replicator device 16 can be connected to every other replicator device 16, forming a pairwise topology (e.g., a "mesh") 98 of interconnected replicator devices 16; each replicator device 16 also is connected to the MCP device 14; hence, each replicator device 16 provides a connection to zero or more endpoint devices 12 for reaching the MCP device 14 and/or another endpoint device 12, described in further detail below. The devices 12 also can have peer to peer connections to one another allowing direct communications without the aid of the core network 10 (hence the name hybrid peer to peer network). Devices 12 can simultaneously communicate either exclusively with each other, peer to peer, with some devices peer to peer and other devices via the core network 10 or with all other devices 12 via the core network 10.

The peer-to-peer network in the secure private core network 10 is based on a trusted aggregation of strict two-way trusted relationships ("cohorts") between two entities: an "entity" can be based on a physical device (e.g., an endpoint device 12 or a physical network device in the secure private core network 10 such as the MCP device 14) having a verified secure relationship with at least an individual person utilizing the physical device; the verified secure relationship also can be with an identified organization associated with the physical device (e.g., a prescribed manufacturer of an endpoint device 12 such as an IoT device, a service provider offering services based on purchase or rental of an endpoint device 12, etc.); the verified secure relationship also can be with another physical device attempting a communication with the physical device (e.g., a physical device executing the MCP device 14 and/or the replicator device 16, another endpoint device 12, etc.). Hence, the secure private core network 10 requires establishment of a strict two-way trusted relationship between two physical devices (also referred to as a "cohort"), where each physical device either is operated by a user, or is a physical device associated with an identified organization (including a corresponding physical device executing the MCP device 14).

Since an individual person (or identified organization) may utilize one or more endpoint devices 12 for network communications, the secure private core network 10 can identify an individual person (or identified organization) based on the allocation of a "federation" identifier (illustrated as "F1") 18 that has a verified secure relationship with one or more physical network devices (e.g., "A" 12, "A1" 12, etc.) that are utilized by the individual person (or identified organization) for communications within the secure data network 5; hence, the secure data network 5 also is referred to herein as a "secure peer-to-peer data network" based on the trusted aggregation of two-way trusted relationships. As described below, the federation ID 18 is generated by an endpoint device 12 during initial registration of a user (e.g., individual person or identified organization) using a secure random number generator that results in a universally unique identifier (UUID) of at least one-hundred twenty eight (128) bits: an example 128-bit UUID can be implemented as proposed by the Internet Engineering Task Force (IETF) (see RFC 4122).

Figure 2:
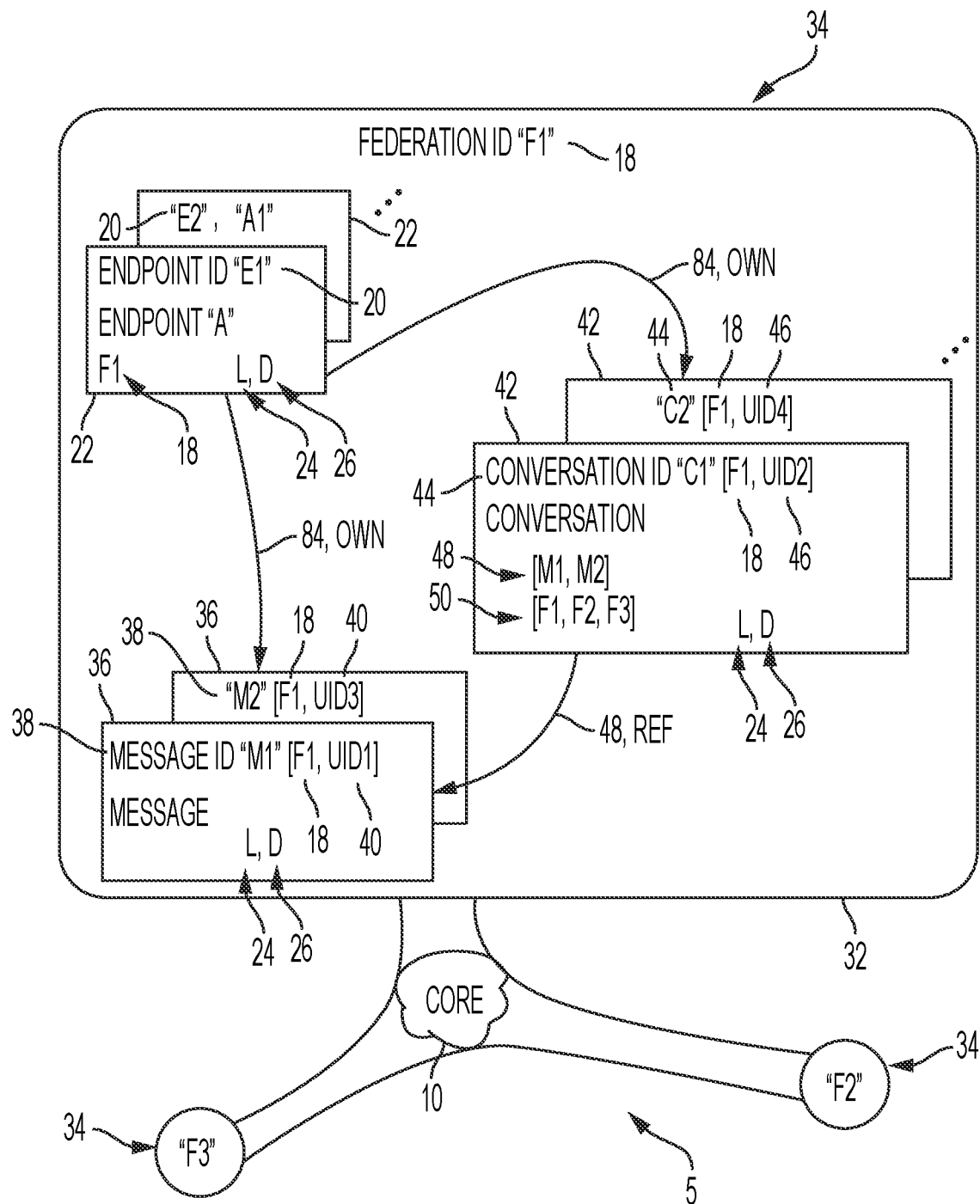
FIG. 2 illustrates example data structures generated and/or stored by an endpoint device associated with a federation identifier owned by a requesting user, for establishment and maintenance of two-way trusted relationships in the secure peer-to-peer data network, according to an example embodiment.

FIG. 2 illustrates example data structures that can identify secure relationships between different entities, for example different endpoint devices 12, different individual persons or organizations, etc. The secure private core network 10 causes each endpoint device 12 during registration with the secure private core network 10 to securely and randomly generate its own self-assigned 128-bit UUID as a unique endpoint identifier 20: the endpoint ID 20 is stored in a data structure referred to as an endpoint object 22 that stores all attributes associated with the corresponding endpoint device 12 in the secure data network 5. As illustrated in FIG. 2 and as described in further detail below, the secure private core network 10 can cause the endpoint device "A" 12 to generate its own endpoint identifier "E1" 20; the secure private core network 10 also can cause the endpoint device "A1" 12 to generate its own endpoint identifier "E2" 20. The endpoint ID 20 provides a permanent (i.e., unchangeable) cryptographically-unique identity for the endpoint device "A" 12.

Each physical device, including each endpoint device 12, is uniquely identified in the secure private core network 10 based on its corresponding endpoint object 22. The endpoint object 22 for each physical device can specify its corresponding endpoint ID 20, the federation ID 18 of the federation 34 to which the physical device belongs, a corresponding lifecycle policy "L" 24, and a corresponding distribution policy "D" 26, described below. The endpoint object 22 for each physical device also can identify a corresponding device type, for example a "human interface" (user interface device), a "thing" (e.g., IoT device, mass storage device, processor device), or a core network component (e.g., an MCP device 14, a replicator device 16, a directory server 28, a community server 30, etc.); hence, a particular device type as specified in the endpoint object 22 can cause the corresponding physical device (e.g., an endpoint device 12), to be allocated or granted selected attributes within the secure private core network 10. Each endpoint object 22 is securely stored in its corresponding physical device in which it represents, and also can be securely stored in other physical devices upon establishment of a two-way trusted relationship, described below.

A federation object 32 is a data structure that has its own unique federation ID 18 and comprises one or more endpoint objects 22: the federation object 32 is established upon secure registration of the first endpoint device 12 and establishment of its corresponding endpoint object 22. As described previously, an individual person (or identified organization) may utilize one or more endpoint devices 12 for network communications; hence, each endpoint object 22 is added to the federation object 32 in response to determining that the corresponding endpoint device (e.g., "A1") 12 has a two-way trusted relationship with a user (or organization) that has previously executed a secure registration with another endpoint device (e.g., "A") 12 in the same federation 32, described below. Hence, the secure private core network 10 can identify an individual person (or identified organization) based on a corresponding federation ID 18 that identifies a collection (i.e., "federation") 34 of one or more endpoint devices 12 having been verified by the secure private core network 10 as each having a secure relationship with the identified person or user.

Hence, a "federation entity" (or simply "federation") 34 as described herein is a logical entity in the secure data network 5, expressed in the secure private core network 10 by its corresponding federation object 32, that uniquely identifies the federation of secured endpoint devices 12 (identified by respective endpoint objects 22) that have a two-way trusted relationship with an individual user or organization. The secure private core network 10 establishes a trusted aggregation of strict two-way trusted relationships between two entities, where each endpoint device 12 of each federation 34 has its own permanent (i.e., unchangeable) and cryptographically-unique endpoint ID 20.

An endpoint device 12 in a federation 34 can generate content as a message object 36 that can be securely stored in one or more endpoint devices 12 in the federation 34. A message object can have different types including messages created within the secure private core network 10 (e.g., a notification object generated by an endpoint device 12 in the secure private core network 10), user created content from a user device 12 (e.g., a text message, an image, a media file, a media stream, etc.), or machine-created content from an IoT device (e.g., a sensor-based data record or media stream, an actuator message, etc.). A message object 36 is identified by a corresponding 256-bit unique message identifier 38 (illustrated in FIG. 2 as "M1" and "M2"): the message ID 38 comprises the federation ID 18 of the federation 34 in which the content was generated, and a corresponding 128-bit message UUID (e.g., "UID1") 40 that is generated by the endpoint device 12 in the federation 34 that generated the content. As described in further detail below, the generation of a message ID 38 that comprises the federation ID 18 provides an ownership reference 84 that establishes an absolute and exclusive ownership right in the content created by the federation 34, such that the content owner of the content in the message object 36 can be identified based on the federation ID 18 in the message ID 38. The message object 36 also can include a corresponding lifecycle policy "L" 24 (identifying for example an expiration date and time that identifies an instance that the associated content is to be automatically deleted from any physical storage device in the secure data network 5), and a corresponding distribution policy "D" 26 (identifying for example a distribution scope such as can only be shared by two users in succession, a distribution start or stop time for granting free access to media content for only one week before or after a concert performance date that is independent of replication of the media content throughout the secure data network 5, etc.). An endpoint device 12 in the federation 34 can distribute content that is stored in a message object 36 based on the endpoint device 12 generating a conversation object 42 comprising a conversation identifier (illustrated as "C1", "C2") 44 that comprises the federation ID 18 and a corresponding 128-bit conversation UUID (e.g., "UID2") 46 that is generated by the endpoint device 12 initiating the distribution of the content (i.e., initiating the "conversation"). The conversation object 42 can be of different types, for example a "post", a "community", a "vault" file system (for secure storage of selected messages at one or more locations). Each conversation object 42 can reference zero or more message objects 36, and therefore can optionally include a message reference (or message "list") 48 of one or more message objects (e.g., "M1", "M2"); each conversation object 42 also can include a subscriber list 50 specifying at least the federation ID 18 of the federation 34 that created the conversation object 42 (e.g., that created the content in the referenced messages "M1" and "M2" from the message reference 48). A given message (e.g., "M2") can be referenced in more than one conversation object (e.g., "C2"), enabling the message (e.g., "M2") to be replicated to different subscribers (e.g., federation "F2" 34 and federation "F3" 34) specified in the subscriber list 50 according to different policies specified by the corresponding lifecycle policy "L" 24 and the corresponding distribution policy "D" 26 in the conversation object "C2"; hence, the same message object 36 need not be duplicated as separate instances. Hence, a message ID 38 can be distributed according to different policies based on utilizing different conversation objects 42. Additional details regarding managing lifecycles for digital conversations can be found, for example, in U.S. Patent Publication No. 2021/0028940.

The federation object 32 can be implemented as a collection of the endpoint objects 22, message objects 36, and conversation objects that specify the same federation ID 18 as owner of the objects. In other words, the ownership within the same federation 34 is established based on storage of the same federation ID 18: within each endpoint object 22; within the message identifier 38 of each message object 36; and/or within the conversation identifier 44 of each conversation object 42. Hence, the federation object 32 can be implemented based on the federation ID 18 providing a reference to the owned endpoint objects 22, message objects 36, and conversation objects that can be stored at different locations within the memory circuit (94 of FIG. 4) of a physical network device; as a result, the federation object 32 need not be implemented as a discrete data structure that includes the owned objects 22, 36, and 38 stored therein.

Hence, each federation 34 in the secure data network 5 is a collection of one or more secured endpoint devices 12 (identified in the secure private core network 10 by its corresponding endpoint object 22) each of which have a two-way trusted relationship with an individual user or organization: each federation 34 is allocated a corresponding federation object 32 having a corresponding unique federation ID 18 that uniquely identifies the federation 34 in the secure data network 5. The federation object 32 can be stored in a memory circuit (94 of FIG. 4) of any one or more of the endpoint devices (e.g., "A") 12 of the federation "F1" 34.

An endpoint device "A1" 12 can initiate a prescribed secure salutation protocol with another endpoint device "A" 12 in order to establish a two-way trusted relationship between the two endpoint devices "A" and "A1" 12 in the federation "F1" 34, resulting in exchange of public encryption keys for pairwise sharing of encrypted content that cannot be decrypted by any intermediate device (e.g., a replicator device 16 in between two devices 12); hence, the addition of a new endpoint device (e.g., a new smartphone, a new smart tablet or laptop computer, etc. "A1") 12 by a user into the federation "F1" 34 enables the new endpoint device "A1" to execute a prescribed secure salutation protocol with at least one other endpoint device (e.g., endpoint device "A" 12), enabling the newly added endpoint device "A1" 12 in the federation "F1" 34 to establish a two-way trusted relationship with the other endpoint device (e.g., endpoint device "A" 12"). An example salutation protocol is illustrated in U.S. Patent Publication No. 2021/0029126.

The establishment of a two-way trusted relationship between the two endpoint devices 12 within the federation "F1" 34 enable the two endpoint devices 12 to execute autonomic synchronization of any portion of the data structures 22, 36, and 42 between any other endpoint device (e.g., "A1") 12 within the federation "F1" 34.

In particular, each physical network device (including each endpoint device 12) includes an autonomic synchronizer (52 of FIG. 1) that is configured for autonomically (i.e. automatically by a machine) synchronizing data structures between physical network devices that are trusted peer devices, for example between endpoint devices 12 that are identified as subscribers of the same conversation identifier 44 (based on the subscriber list 50): the autonomic synchronizer 52 can autonomically synchronize data structures between any pair of physical network devices having a two-way trusted relationship based on determining any differential hypercontent state (e.g., stored changes) between the stored data objects 22 identified in the message reference 48: the autonomic synchronizer 52 can reconcile any differential hypercontent state between any data objects 22 stored in different endpoint devices 12, resulting in updating the data objects 22 to a most recent version instantaneously in each endpoint device 12 connected to the secure data network 5; any disconnected endpoint device 12 can execute autonomic synchronization upon reconnection to the secure private core network 10, and/or in response to a P2P (peer to peer) connection with a trusted peer endpoint device 12 (e.g., within its own federation 34 or another federation 34, as appropriate). Endpoint devices 12 within the same federation 34 also can execute autonomic synchronization of all data structures in the federation object 32 (including the federation object 32 itself), according to the policies set in the respective endpoint object 22. Hence, any endpoint device 12 (e.g., endpoint device "A1" 12) that is offline for some time interval can execute autonomic synchronization for updating of its stored content with the other endpoint devices 12 in its federation 34.

The autonomic synchronizer 52 is configured for executing pairwise synchronization between trusted peer devices 12 in response to each update to a data object. In particular, each and every data object that is created and stored in the secure data network 5 comprises a creation timestamp indicating a time that the data object was created, and a "last change" timestamp (i.e., update timestamp) indicating the last time the data object was updated. Hence, the autonomic synchronizer 52 can execute, in cooperation with a corresponding autonomic synchronizer 52 in a trusted peer device, a pairwise update of an older copy of each data object to the most recently available update based on comparing the relative update timestamps.

The autonomic synchronizer 52 of an endpoint device (e.g., "A") 12 utilizes a "database version number" for each other trusted physical network device (e.g., "A1", "R1", "B", "C", "MCP") in which the endpoint device "A" 12 has established a trusted relationship, resulting in a corresponding pairwise relationship in the database version number between trusted peer devices 12. In response to the trusted peer devices 12 connecting to each other (e.g., either directly via a local P2P data link, a logical P2P data connection via an external data network (96 of FIG. 5 or 6, or via the secure private core network 10), the autonomic synchronizers 52 in the trusted peer devices 12 can track their respective database version numbers and in response can update their database versions along with the associated database changes.

Since different endpoint devices can be "online" or "offline" at different instances, a "disconnected" endpoint device (e.g., "A1") can develop changes or "versions" that "drift apart" from the synchronized versions among the trusted peer devices that are connected to the secure private core network 10, for example where a federation owner is updating a message object (e.g., a note or memorandum) 36 using the "disconnected" endpoint device (e.g., "A1"). Hence, the autonomic synchronizer 52 of an endpoint device (e.g., "B") 12 can respond to reconnection with the secure private core network 10 (or a trusted peer device 12 via a P2P data connection) by comparing its "database version number" (e.g., the database version number associated with its peer "A") and determine if synchronization is needed.

The autonomic synchronizer 52 also can track changes of all locally-stored data objects based on creating a hash of a database state: the database state represents all locally-stored data objects as tuples of a data object identifier and the "last change" timestamp. Example locally-stored data objects that can be generated by a federation owner on an endpoint device 12, and replicated and synchronized with other endpoint devices 12, can include: endpoint objects 22; conversation objects 42; message objects 36; outcasted endpoints, conversations and messages that are removed from a federation 34; membership of federations in conversations (e.g., subscriber lists 50); cohorts within a federation; voting state for conversations and messages; a vault file system within a federation; password recovery information for participants in password recovery; "shared" configuration between devices within a federation; etc.

Hence, any one or more of the endpoint devices 12 of a first federation (e.g., "F1") 34 can cause the secure private core network 10 to execute autonomic synchronization of any portion of the data structures 22, 36, and 42 in any other federation (e.g., "F2" or "F3") 34 in which the first federation has established a two-way trusted relationship, based on the subscriber list 50 in a given conversation object 42: the autonomic synchronization is executed in a secure manner that ensures that all data structures always stored securely in a non-transitory machine readable medium, and that all data structures are always transmitted securely, for example via a wireless (or wired) transmission medium.

For example, any data object (e.g., 22, 36, and/or 42) that is generated and stored within an endpoint device 12 (e.g., "A") can be encrypted using its public key (e.g., "KeyP1_A"); any data object that is sent from an originating endpoint device 12 (e.g., "A") to a cohort (e.g., "B") (either within its federation "F1" 34 or in another federation "F2" 34) for secure storage can be encrypted using the originator private key (e.g., "prvKeyP1_A") and the cohort public key (e.g., "Key_B"), and further encrypted using a temporal key prior to transmission to the cohort. The cohort can decrypt the transmitted data object based on the temporal key (described below) and store the object that was encrypted using the originator private key (e.g., "prvKeyP1_A") and the cohort public key (e.g., "Key_B").

As described below, the verified secure relationship is established via a "two-way trusted relationship" that is verified by the MCP device 14 via the first party (e.g., an individual person, organization, or another physical device) and via the second party (e.g., via the physical network device); in other words, no third-party authentication (e.g., by a certifying authority outside the authority of the secure private core network 10) is permitted in the secure private core network 10, nor is any one-way verification permitted in the secure private core network 10; hence, the trusted aggregation of multiple two-way trusted relationships establishes the hybrid peer-to-peer overlay network in the secure private core network 10.

Figure 3:
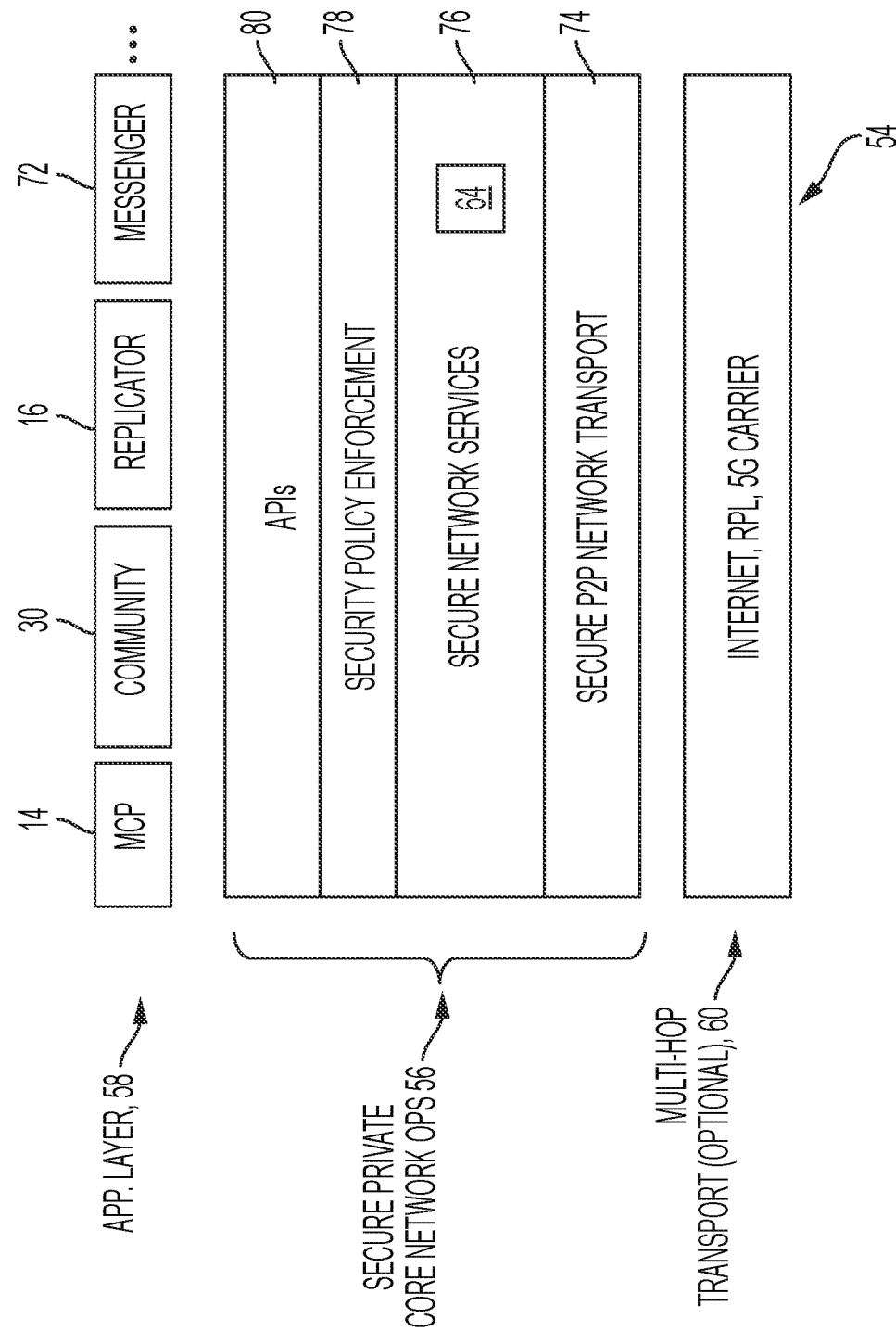
FIG. 3 illustrates an example implementation in an apparatus of executable code configured for providing operations for deployment of the secure peer-to-peer data network, according to an example embodiment.

FIG. 3 illustrates an example implementation 54 in a physical network device (e.g., an endpoint device 12) for deployment of the secure data network 5 in a physical data network, according to an example embodiment. The example implementation 54 includes execution of secure private core network operations 56, and execution of selected application layer resources 58 for formation of the secure data network 5. For example, the application layer resources 58 can include executable application code that causes a physical network device to selectively execute element-specific operations within the secure private core network 10, for example an MCP device 14, a replicator device 16, a community server 30; as shown in FIG. 1, additional application layer resources 58 that can be deployed in the secure private core network 10 by a physical network device (e.g., an endpoint device 12) can include a directory server 28 (hosted in the same network executing the MCP device 14), a community server 30 (hosted in the same physical network device executing the MCP device 14), and a load balancer 62 for allocating each endpoint device 12 to a replicator device 16. The application layer resources 58 also can include a messenger application 72 that enables a user of an endpoint device 12 (e.g., a 5G smart phone) to send and receive content using conversation objects 42, for example in the form of instant messages, public/private forum posts, etc. An example of the messenger application 72 that utilizes the "signet" as described herein is the commercially available application "Society" from WhiteStar Communications, Inc., Durham, North Carolina, at the web site address "https://societyapp.io/".

The secure private core network operations 56 can be executed by each of the physical network devices in the secure data network 5 (including each of the endpoint devices 12) executing machine-executable code that can be implemented in each physical network device in the form of a self-contained "network operating system" (NOS) 56. The "network operating system" 56 can be implemented for deployment on various network device platforms, for example as a native operating system (e.g., for an IoT device or a physical network device dedicated for use in the secure data network 5), or as an executable "app" that can be installed and executed on a device utilizing an operating system such as Android, iOS, Microsoft Windows 10, or any other Unix-based operating system.

The network operating system 56 can include machine-executable code for executing numerous security-based operations in the secure data network 5, including establishment of a secure peer-to-peer (P2P) network transport 74 based on a dynamic generation of a unique encrypted temporal key for each and every data packet that traverses the secure data network 5, providing secure network services 76, providing security policy enforcement 78, and providing application programming interfaces (APIs) 80.

Example secure network services 76, illustrated for example in FIGS. 1 and 3, can include machine-executable code for executing an Artificial Intelligence (AI) based security service 64 that comprises a guardian service 66, a sentinel service 68, and a navigator service 70. Additional example secure network services 76 can include machine-executable code for executing a prescribed secure salutation protocol with another physical network device (e.g., another endpoint device 12) for establishment of a secure two-way trusted relationship, executing management of messages or conversations (e.g., according to a lifecycle policy "L" 24 and/or a distribution policy "D" 26), executing management of secure and permanent deletion of data objects or an endpoint device 12 from the secure data network 5 ("zeroization"), account management, etc. Another example secure network service 76, illustrated in FIG. 1, includes machine-executable code for executing a distributed search (DS) agent 82: the distributed search (DS) agent 82 can execute AI analytics and generate metadata for AI operations; the distributed search (DS) agent 82 is configured for generation and selected synchronization of "projections" with other distributed search (DS) agents 82 that enable real-time searches to be executed by any endpoint device 12, an MCP device 14, any replicator device 16, a directory server 28 or community server 30, and/or any of the components or executable agents of the AI-based security service 64.

The APIs provide prescribed commands that are available to the application layer resources 58 for execution of the secure private core network operations 56; moreover, the APIs 58 separate application logic from the need for any domain knowledge of the underlying data network that is implementing the secure data network 5. Hence, the example implementation 54 enables application developers to create the application layer resources 58 without any need of domain knowledge, and without any need to learn any security-based protocols, since the secure private core network operations 56 can ensure that the secure data network 5 provides a secure network that can prevent network intrusion.

A problem in prior deployments of cyber security is that no known security system for a user network device maintained cryptographic security of a data packet having an encrypted payload that is received via a data network. To the contrary, at most a resource in a user network device would decrypt the encrypted payload to recover a decrypted payload, and store the decrypted payload as a local data structure in a memory circuit of the user network device. Hence, the storage of the decrypted payload "at rest" within a memory circuit of the user network device exposed the decrypted payload to a potential cyber-attack.

Although existing encryption applications enabled a user to execute encryption of locally-stored data structures on his or her user network device, such encryption applications are executed at the "application layer", resulting in the exposure of the decrypted data packet at the operating system level until a user executes the encryption application in the user network device for encryption of the locally-stored data structures.

Access to the secure private core network 10 by any physical network device 88 requires installation and instantiation of the network operating system 56. Further, the network operating system 56 operates as a secure executable container that only allows access to an internal executable code, access to an "at-rest" or "in-flight" stored data structure, or access to the secure data network 5 only via one or more of the prescribed APIs 80.

Hence, the network operating system 56 prevents any executable resource in a physical network device 88 (or a user of the physical network device 88) from accessing any unencrypted form of any "at-rest" first secure data structures encrypted and stored by the network operation system 56 in the physical network device 88, without authorized access via a prescribed API 80. The network operating system 56 also prevents any executable resource in the physical network device 88 (or a user of the physical network device 88)

from accessing any unencrypted form of any "in-flight" second secure data structures encrypted and stored by the network operation system 56, without authorized access via a prescribed API 80. The network operating system 56 also prevents any executable resource in the physical network device 88 (or a user of the physical network device 88) from accessing the secure peer-to-peer data network, without authorized access via a prescribed API 80 required by the network operating system 56.

Hence, the network operating system 56 establishes a "closed" access system that requires authorized access via one or more of the APIs 80.

As illustrated in FIG. 3, the example implementation 54 also can optionally include a multi-hop transport layer 60 that enables the secure data network 5 to be deployed overlying an existing network infrastructure, for example the Internet or another multi-hop data network (96 of FIG. 5), for example a private network provided by a wireless 5G service provider (e.g., Verizon, AT&T, etc.), or a private network constructed according to an alternative multi-hop protocol such as the Routing Protocol for Low Power and Lossy Networks (RPL) according to the Internet Engineering Task Force (IETF) Request for Comments (RFC) 6550. Hence, the secure data network 5 can be deployed as a private network (e.g., by a 5G service provider or a RPL-based network) for use by private subscribers, without any data traffic exposed to the Internet. The secure data network 5 also can be deployed, however, from the "ground up" based on an aggregation of multiple trusted P2P connections using the secure P2P network transport 74 across multiple physical network devices establishing a mesh of peer to peer connections (e.g., via the pairwise topology 98 of replicator devices 16), resulting in the potential deployment of a worldwide deployment of a secure data network 5, without the Internet.

The security policy enforcement 78 provides an enforcement of application-level and user level "manners and semantics" that ensures compliance with digital rights and user relationship rights in the secure private core network 10. In one example, if an errant application (or user) attempted to modify content it did not have rights to (e.g., a user in the federation "F2" 34 attempted to modify content in a message ID 38 generated by the user of the federation "F1" 34 as identified by the federation ID "F1" 18 in the message ID 38), the security policy enforcement 78 can block the attempt to modify the content. As apparent from this example, the security policy enforcement 78 can prevent unauthorized manipulation of media content that has resulted in a proliferation of "deep fake" videos.

The security policy enforcement 78 also provides an enforcement of user digital rights, where at any time a user in the federation "F1" 34 can amend or delete instantaneously any one content item owned by the user (i.e., that includes the corresponding federation ID "F1" as part of its message ID 38): the security policy enforcement 78 can cause all autonomic synchronizers 52 that have a cohort relationship with the federation "F1" to instantly amend or delete the content item identified by its message ID 38.

The security policy enforcement 78 also can enforce various trust levels between an identified cohort, for example a progression from a transient trust (based on location proximity or common interests) to a permanent trust relationship; the security policy enforcement 78 also can enforce a revoked trust ("outcasting"), where the security policy enforcement 78 can respond to a user of the federation "F1" 34 wishing to revoke a relationship with the user of the federation "F2" 34; in this case, the security policy enforcement 78 can provide various warnings regarding revoking a relationship ("outcasting"), including loss of shared data, loss of shared contacts, etc.; as such, the security policy enforcement 78 can encourage dispute resolution between two parties to encourage that societal contracts are fulfilled.

The security policy enforcement 78 also can enforce proper semantic behaviors in the secure private core network 10, including ensuring API calls (by the APIs 80) are presented in the appropriate sequence (i.e., not out-of-order), and that a user of a federation 34 performs social-based operations in the secure private core network 10 in the appropriate order, e.g., a user cannot "join" a conversation without having been invited to join the conversation, and a user cannot "leave" a conversation without first being joined as a member, etc.

Hence, the example implementation 54 can ensure reliable establishment of cohorts, and can enforce security policies that ensure preservation of media rights and maintaining mutual trust between users via their federations 34.

A fundamental problem in the Internet is that prior to deployment of Dynamic Host Configuration Protocol (DHCP), IP addresses at first were allocated (in prescribed address ranges or "blocks") to organizations, and specific IP addresses could be fixed to a specific location (e.g., an office); hence, an Internet Protocol (IP) address had been used to identify a business, a business location (e.g., office location), a person (e.g., an individual utilizing an office having a network connection), and/or a physical network device (e.g., a personal computer operated by the person within the office and utilizing the network connection). However, the use of DHCP, NAT/PAT, wireless access on a guest network, etc., demonstrates than an IP address does not, in fact, accurately represent any one of a business, a location, a person, or a physical network device.

Another fundamental problem in the Internet is that it is built from its Border Gateway Protocol (BGP) core outward to BGP peers that operate as respective Autonomous Systems (ASs), to establish a BGP mesh network, each AS subdividing out from there toward a network edge; hence, a network is not considered "converged" until any one IP address (source address) can route a data packet to any other destination IP address. In addition to causing scaling problems as more networks and more devices are added to the Internet, this universal reachability from any source IP address to any destination IP address also introduces severe security threats since any "threat device" originating at a "source" IP address can threaten any "target device" at a "destination" IP address. In other words, anyone can obtain unrestricted access to the Internet via a threat device using a "source" IP address, and target devices at destination IP addresses need to expend significant resources to prevent intrusion by the threat device.

These security threats are magnified by orders of magnitude by cloud computing services using data centers worldwide for replication of data for cloud-based services: a successful attack on any one of the millions of IP addresses in use by a cloud computing service has the potential to disrupt the entire worldwide cloud computing service for millions of customers of the cloud computing service. Attempts to implement a "zero trust network" (e.g., at a utility company, a gas pipeline company, etc.) in order to avoid a cyber-attack are ultimately ineffective because a "threat device" still has Internet-based access to numerous entry points within the "zero trust network", which can be in the range of millions of IP addresses that the zero trust network relies on for cloud-based services: in other words, a zero trust network utilizing cloud-based services can have an attack surface area of over one million IP address.

The secure private core network 10 is implemented with the following security features and operations: the secure private core network 10 can provide full privacy for each endpoint device 12; the secure private core network 10 can ensure free association of users or their associated endpoint devices 12 (i.e., no third party can force a disassociation or disconnection between two associated users that have formed an association between each other); the secure private core network 10 can enable the protection of ownership of all content by users (i.e., user content cannot be "stolen" by another user); and the secure private core network 10 can eliminate the necessity for centralized services, controls, costs, such as found in a cloud-based computing system. The secure private core network 10 also can prevent unauthorized monetization of users' data, and also can facilitate integrated money exchange.

The secure private core network 10 is implemented as a hybrid peer-to-peer overlay network that does not contain any centralized controls as found in a cloud-based computing system; to the contrary, the secure private core network 10 can be composed based on aggregating a large number of small, decentralized, networks that are built by endpoint devices 12 at the "edge" of the network. Moreover, the secure private core network 10 can inherently implement security as a core policy (i.e., a "base tenant" of the secure private core network 10), where each decentralized network has a limited number of network nodes, and every user must "opt-in" before communicating with another network node.

Hence, the secure private core network 10 can initiate a two-device secure data network 5 between two endpoint devices 12 (e.g., between two individuals sharing data between two smart phones via a local P2P link and/or via a P2P connection established via the external data network 96), and can aggregate additional devices 12 for eventual formation of a worldwide secure data network.

The secure private core network 10 comprises a single MCP device 14 that is implemented by a physical network device (e.g., an endpoint device 12) such as a user device, or a high-end computing device (e.g., a server device owned by a private network provider such as a 5G service provider, etc.) executing the executable application resource "MCP" 58 illustrated in FIG. 3; in other words, the MCP device 14 can be deployed as an executable application layer resource 58 that can be executed on any physical network device. In one example, a user device (e.g., a 5G smart phone) can initiate execution of the application resource "MCP" 58 (overlying the 5G smart phone execution of the secure private core network operations 56 as a "network operating system" app) for establishment of the secure data network 5 as a private peer-to-peer data network in an isolated region that has a limited number of users (e.g., around twenty users in an isolated region that has no connection to a 5G service provider network or wide area network).

The MCP device 14 operates as a prescribed management agent in the secure peer-to-peer data network 5. Hence, only one MCP device 14 is executed in the secure data network 5 at a given time, even though an isolated secure data network 5 can have its own MCP device 14: hence, a physical network device must halt execution of its MCP device 14 prior to joining another secure data network 5 (e.g., executing a merge operation with a larger, pre-existing secure private core network 10 hosted by a 5G service provider). The MCP device 14 can manage subscriptions and registrations by individuals or businesses to the secure data network 5, accounting, load balancing (executed by the load balancer 62), endpoint-replicator assignment (including tracking endpoint—replicator connections for replicator queries), and software update compatibility enforcement. The MCP device 14 also can coordinate with AI-based assist operations provided for example by the AI-based security service 64 (e.g., connection assist using the navigator service 70, salutation assist, conversation assist using the community server 30, revocation assist, zeroization assist, etc.).

The MCP device 14 is connected to each and every replicator device 16, and can maintain a mapping of every endpoint device 12 to a state (either offline or connected to an identified replicator device 16).

The replicator device 16 can be deployed as an executable application layer resource 58 that can be executed on any physical network device. Each replicator device 16 can establish a secure two-way trusted relationship with the MCP device 14 using a prescribed secure salutation protocol that includes negotiation of a public key pair; each replicator device 16 also can establish a secure two-way trusted relationship with all other available replicator devices 16 (using a prescribed secure salutation protocol that includes negotiation of a public key pair) to form a pairwise topology 98 (i.e., one logical hop between each replicator); each replicator device 16 can provide connections between endpoint devices 12 using various secure network transport operations, including crypto tunnelling described below. Hence, each endpoint device 12 can be connected to another endpoint device by zero logical hops (pure peer-to-peer (P2P) connection "A-A1" in FIG. 1 or "A-D" in FIG. 6), one logical hybrid P2P hop (e.g., "B-R100-C"), or two-logical hybrid P2P hops (e.g., "A-R1-R100-B"). Each logical connection is based on a first party trusted relationship established by a replicator (e.g., replicator device "R1" 16) and its peer replicator (e.g., replicator device "R100" 16). Replicator devices 16 each include a flow table (forwarding information base) for forwarding received packets after packet authentication. In particular, each replicator device 16 can include a flow table entry 154 that maintains a flow state for reaching a destination endpoint device via an identified trusted peer replicator device 16; each replicator device 16 also can establish a forwarding information base (FIB) entry 156 that enables the replicator device 16 to reach each trusted peer replicator device 16 and each connected endpoint device 12.

The directory server 28 can be executed by MCP device 14. The directory server 28 is configured for managing ontologies of data structures (e.g., caching intermediate results), storing tags, federation IDs etc. (for projections, e.g., parallel searches by the distributed search (DS) agent 82 of one or more physical network devices such as endpoint devices 12).

The community server 30 can be executed by the MCP device 14 and/or any endpoint device 12; the community server 30 is configured for hosting posts within a public and/or private community in the secure private core network 10.

The guardian service 66 can be executed as part of the secure network services 76 and can manage protection of data during transmission or reception ("in-flight") and while stored on a machine-readable non-transitory storage medium ("at rest"), including maintaining persistence of endpoint objects 22, conversation objects 42, and message objects 36 according to the associated lifecycle policy "L" 24 and distribution policy "D" 26.

The navigator service 70 can be executed as part of the secure network services 76 and can manage connectivity graphs for how to connect cohorts; the navigator service 70 also can warn the sentinel service 68 of detected threats, and the navigator service 70 can respond to threats detected by the sentinel service 68.

The sentinel service 68 can be executed as part of the secure network services 76 and can detect threats in real time, mitigate against detected threats (e.g., warning user, automatic mitigation operations, etc., notifying the navigator service 70), etc.

The guardian service (i.e., guardian security agent) 66, sentinel service (i.e., sentinel security agent) 68, and navigator service (i.e., navigator security agent) 70 executed as part of the AI-based security service 64 in the secure network services 76 are scalable in that every physical network device can execute the various services 66, 68, and 70 at a scale corresponding to the associated application operations 58 of the physical device executing the associated application layer resources 58; hence, executable agents 66, 68, and 70 operating in one endpoint device (e.g., "A" 12) can securely communicate and share metadata (e.g., feature data such as cyber-attack feature data, wireless network feature data, etc.) with agents operating in other physical network devices (e.g., "R1", "R100", the MCP device 14, endpoint device "B" 12) to localize and identify potential threats and prevent any attacks within the secure private core network 10. Hence, the AI-based security service 64 can manage user metadata in order to enhance user security, as opposed to monitoring user metadata for monetizing.

The distributed search (DS) agent 82 can execute projections: in relational algebra a projection refers to a subset of columns of information; hence, a distributed search (DS) agent 82 can apply a subset of information from a data structure (e.g., a federation ID 18, endpoint ID 20, message ID 38, conversation identifier 44, endpoint object 22, message object 36, conversation object 42 or a hypercontent component thereof), to decompose a mapping of a database lookup into a set of queries and subqueries; the generation of a projection enables execution of parallel distributed searches. A projection can be created by a distributed search (DS) agent 82 executed by any physical network device within the secure data network 5. A projection generated by a distributed search (DS) agent 82 can have a defined scope (or "extent"), for example, local, within a federation 34, within a conversation, global, etc.; a projection also can have different types (e.g., one-time, until a deadline, etc.), and can be named with arbitrary names (e.g., contact lookup, signet scan, etc.). Each projection defines an arbitrary number of "projection entries" that are used to match fields using various search techniques, and to select which fields associated with the matches should be returned; the fields can be arbitrary types of information in the secure data network 5 (e.g., signet, endpoint ID 20, email address, tag, message ID 38, conversation identifier 44, titles, names, hypercontent, URLs, etc.), and the values for matches can be exact matches or regular expressions ("regex") comprising a sequence of characters that have a matching pattern. Each projection entry can select a number of fields that should be returned when matches select information: if no matches are found for a projection entry then no record is returned; for matches, values for the fields selected are returned along with the associated projection entry tag.

Hence, a distributed search (DS) agent 82 can execute a projection that has a scope that limits the extent of a search: the scope can be limited at different locations: for example a scope can limit a search by an endpoint device 12 to a common word usage, old passwords, etc.; a scope can limit a search by a replicator device 16 to GIF image searches, for example; a scope can limit a search by the MCP device 14 to limited fields to preserve privacy of users of the endpoint devices 12, for example limiting searches to a hash of a user email (and not the actual email which is not made available to the MCP device 14), federation ID 18, endpoint ID 20; a scope also can limit a search by the directory server 28 and/or the community server 30. Projections can be executed once, continuously, periodically, until a prescribed "event" deadline (e.g., time expiration, project deadline reached, etc.).

A distributed search (DS) agent 82 also can obtain metadata from other agents executed in the secure private core network 10 to extract feature graphs for assistance in AI-based decisions such as recommendations whether to accept connection requests or conversation requests, keyboard word suggestions, etc.

Hence, the implementation of the secure private core network 10 as a cloudless hybrid peer-to-peer overlay network enables every person and every device to be securely connected, and as such is a realization of "Metcalf's Law" that the value of a telecommunications network is proportional to the square of the number of connected users of the system. The implementation of the secure private core network 10 as a cloudless hybrid peer-to-peer overlay network can extend security features and security operations that mimic social networks without technical constraints, and the use of AI enables the secure private core network 10 to fit policy and interaction requirements of individual users (i.e., people), as opposed to requiring people to adapt to technical constraints.

Hence, the aggregation of two-way trusted relationships in the secure private core network 10 ensures that any attack surface area within the secure data network 5 is limited to two devices at any time, requiring any "threat device" to successfully hack the secure keys of the two peer devices before being able to compromise only the pairwise-encrypted content shared only between the two peer devices; hence, any further attack would require the threat device to successfully hack a next pair of secure keys, etc.

The secure private core network 10 also can include a sensor network comprising one or more sensor devices (e.g., Internet of Things-based sensor devices): each sensor device has a trusted relationship with at least another sensor device, or a trusted relationship with another entity that enables the sensor device to associate with a single individual, a PAN, a room area network, etc.

Depending on implementation, the secure data network 5 can be established as an aggregation of decentralized secure networks. Each decentralized network can be connected to another decentralized network by one or more private dedicated optical fiber connections ("dark fiber pairs") that are part of a private backbone network: the private backbone network can utilize one or more optical network carriers on diverse fiber paths in order to provide a regionally redundant connectivity over large geographic areas (e.g., providing connectivity between eastern United States, southwest United States, Midwest United States, etc.). Sub-oceanic fiber paths and/or satellite communications also can be used to extend the private backbone network in one geographic region to a worldwide private backbone network. The private backbone network also can be managed by a "bare metal infrastructure" where any server devices executing any network-based operations are single-tenant server devices, i.e., the server devices are reserved for the exclusive use of the private backbone network only, with no use by a third-party tenant permitted (as opposed to existing cloud computing systems that can "share tenants" on a single network device). Further, all data in the private backbone network is always encrypted by default, regardless of whether the data is stored on a non-transitory machine-readable storage medium (i.e., "at rest"), or whether the data is undergoing wired or wireless transmission (i.e., "in transit").

Hardware Device Overview

Figure 4:
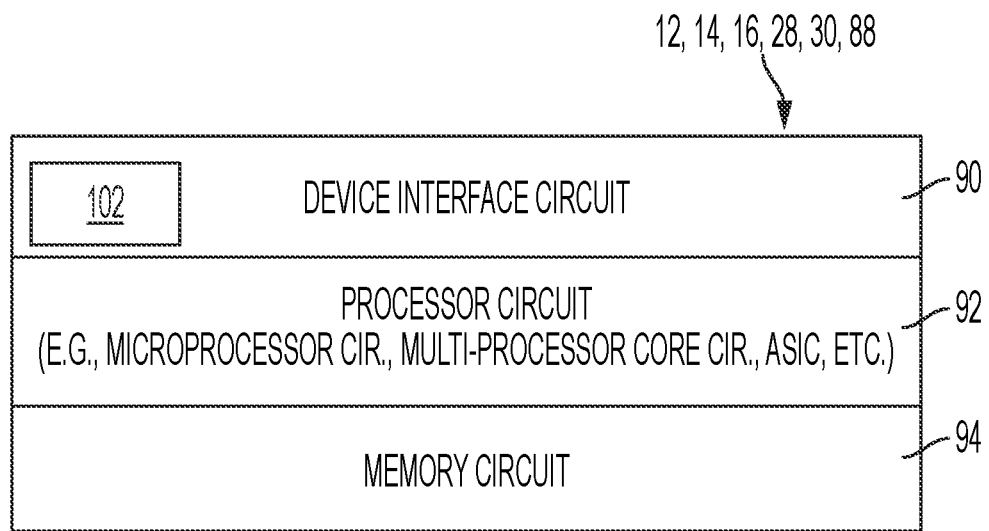
FIG. 4 illustrates an example implementation of any of the network devices described with reference to any of the Figures, according to an example embodiment.

FIG. 4 illustrates an example implementation of any one of the physical network devices shown in any of the other Figures (e.g., 12, 14, 16, 28, 30, and or 88 of FIGS. 1, 2, and/or 6), according to an example embodiment.

Each apparatus (e.g., 12, 14, 16, 28, 30, and or 88 of FIGS. 1, 2, 5 and/or 6) can include a device interface circuit 90, a processor circuit 92, and a memory circuit 94. The device interface circuit 90 can include one or more distinct physical layer transceivers for communication with any one of the other devices (e.g., 12, 14, 16, 28, 30, and or 88); the device interface circuit 90 also can include an IEEE based Ethernet transceiver for communications with the devices of FIG. 1 via any type of data link (e.g., a wired or wireless link, an optical link, etc.). The device interface circuit 90 also can include a sensor circuit 102 (comprising, for example a touchscreen sensor, a microphone, one or more cameras, and/or an accelerometer, etc.). The processor circuit 92 can be configured for executing any of the operations described herein, and the memory circuit 94 can be configured for storing any data or data packets as described herein.

Any of the disclosed circuits of the devices (e.g., 12, 14, 16, 28, 30, and or 88) (including the device interface circuit 90, the processor circuit 92, the memory circuit 94, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 94) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 94 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 94 can be implemented dynamically by the processor circuit 92, for example based on memory address assignment and partitioning executed by the processor circuit 92.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Identity Management System Forming Two-Way Trusted Relationships Based on Device Identity Container The example embodiments enable the secure establishment of universally-unique identities in a secure peer-to-peer data network 5 that is established based on an aggregation of two-way trusted relationships, all under the control of the AI based security suite 64. The secure establishment of universally-unique identities is based on establishing a unique federation identifier for a "requesting party" (e.g., user, business entity, etc.) once a two-way trusted relationship has been established between the requesting party and the secure peer-to-peer data network, and establishing a permanent and unique endpoint identifier for a network device used by the requesting party for joining the secure peer-to-peer data network. The endpoint identifier is associated with the federation identifier to establish that the requesting party has ownership of the corresponding network device, where the "ownership" establishes a two-way trusted relationship between the requesting party and the corresponding network device based on the requesting party retaining possession and control of the network device; hence, the endpoint identifier (associated with the federation identifier) can uniquely identify the network device in the secure peer-to-peer data network as an "endpoint device" that is associated with the requesting party based on a two-way trusted relationship between the requesting party and the endpoint device.

The requesting party can add additional network devices as distinct endpoint devices that are associated with the federation identifier based on a corresponding two-way trusted relationship between the requesting party and the corresponding network device, under the control of the AI based security suite. Hence, a requesting user can aggregate a "federation" of trusted endpoint devices for use within the secure peer-to-peer data network.

Moreover, each endpoint device can uniquely and securely identify itself based on the AI based security suite cryptographically generating a secure private key and a corresponding secure public key associated with the requesting party utilizing the endpoint device. Hence, data storage in each and every network device in the secure peer-to-peer data network, as well as all network communications between each and every network device, can be secured by the guardian security agent based on sharing secure public keys between endpoint devices having established a two-way trusted relationship based on a secure verification of membership within the same "federation" according to a prescribed secure salutation protocol under the control of the AI based security suite.

The following description summarizes the establishment of the secure peer-to-peer data network 5 as a trusted aggregation of two-way first-party trusted relationships, also referred to as "cohorts". Each two-way first-party trusted relationship requires a requesting party "X" to send a relationship request directly to a recipient party "Y" (the first "way" of the two-way first-party trusted relationship), i.e., no "requesting agent" can act on behalf of the requesting party "X" without explicit authorization from the requesting party "X" to send the request; similarly, no "receiving agent" can act on behalf of a recipient party "Y" without explicit authorization from the recipient party "Y". The relationship request can include a secure public key "Key_X" associated with the requesting party "X" (i.e., the requesting party "X" owns a private key "prvKey_X" corresponding to the secure public key "Key_X"), as opposed to relying on any trust in a secure certificate issued by a third party certifying authority. The recipient party "Y" can decide to accept the request or deny the request; if the recipient party "Y" decides to accept the relationship request, the recipient party "Y" can store the secure public key "Key_X" and send to the requesting party "X" an acknowledgment that contains the secure public key "Key_Y" of the recipient party "Y" (i.e., the recipient party "Y" owns a private key "prvKey_Y" corresponding to the secure public key "Key_Y"). The acknowledgment can be encrypted using a temporal key generated by the recipient party "Y": the recipient party can encrypt the temporal key using the secure public key "Key_X", and add to the encrypted acknowledgment (containing the secure public key "Key_Y") the encrypted temporal key. Encryption can be executed, for example, using data encryption standard (DES), TripleDES, RSA, Advanced Encryption Standard (AES), ECIES, etc.

Hence, the requesting party "X", in response to receiving the encrypted acknowledgment containing the encrypted temporal key, can recover the temporal key based on decryption using the corresponding private key "prvKey_X", and decrypt the encrypted acknowledgment using the recovered temporal key to obtain the secure public key "Key_Y". Hence, the two-way first-party trusted relationship between the parties "X" and "Y", or "cohort" between "X" and "Y", can be securely maintained based on the secure storage of data ("at rest") using the key pairs "Key_X" and "Key_Y"; secure communications between the endpoint devices 12 associated with the cohort "X" and "Y" also can be secured based on encrypting each data packet prior to transmission using a temporal key, where the temporal key also is encrypted (using the key of the destination device) to form an encrypted temporal key that is supplied with the encrypted data packet for decryption at the destination.

The aggregation of cohorts between two endpoint devices 12 (pairs of pairs of pairs) ensures that the attack surface area in the secure data network 5 is no more than two ("2") devices, regardless of the size of the secure data network 5. Use of encrypted temporal keys ensures that every transmitted data packet has a different key needed for decryption following transmission. Every data structure stored in the secure data network 5 has a different encryption with a different key, such that the "prize" for hacking a stored data file is only the one hacked data file.

Figure 5:
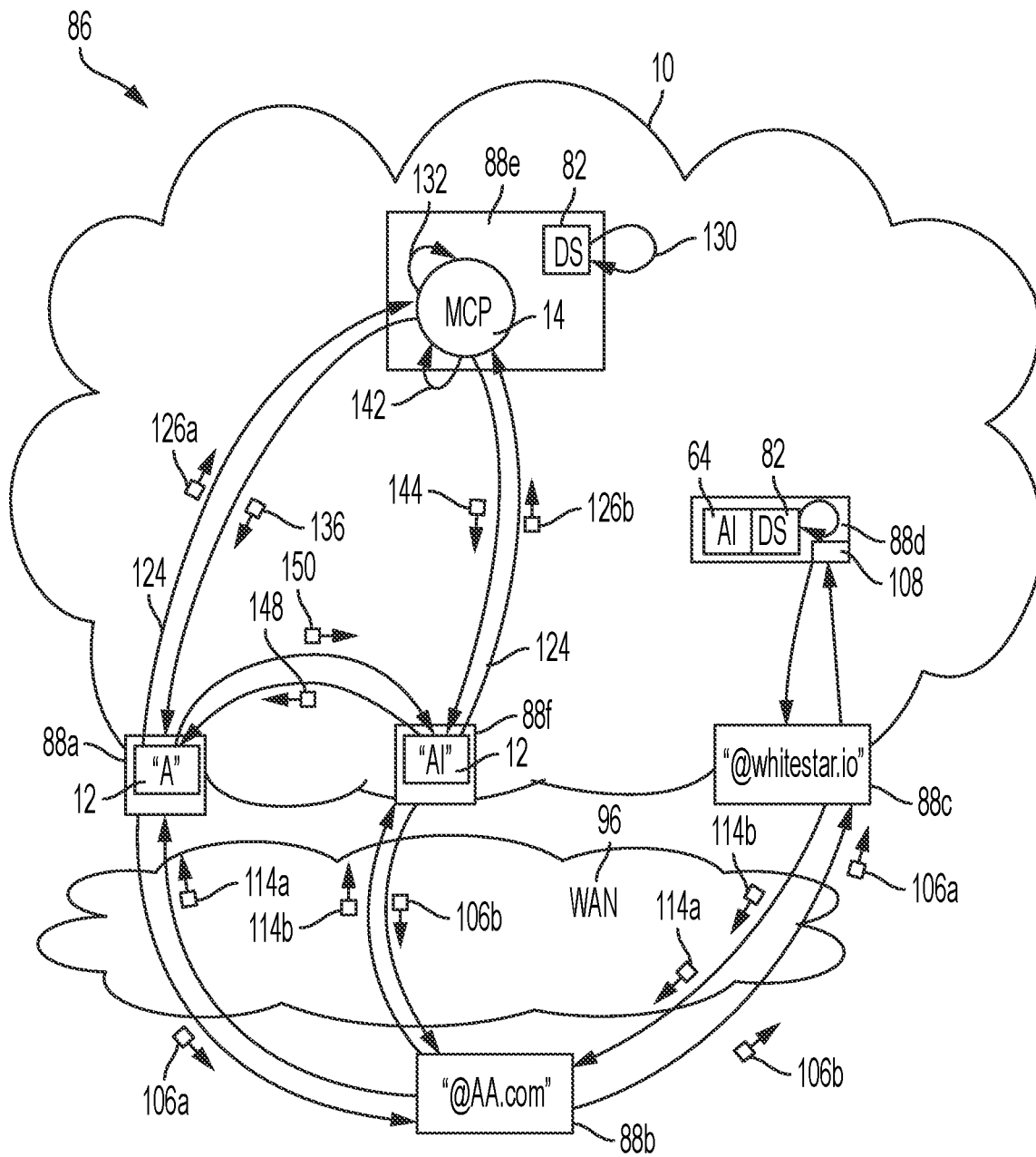
FIG. 5 illustrates in further detail interactions between user-controlled network devices, server network devices in an external data network, and one or more server network devices in the secure peer-to-peer data network, in establishing a two-way trusted relationship for creation of a federation identifier in the secure peer-to-peer data network for the requesting user and an endpoint identifier associated with the federation identifier for each endpoint device of the requesting user, according to an example embodiment.

FIG. 5 illustrates an example identity management system 86 that can be implemented in the secure private core network 10 for secure establishment of trusted relationships in the secure data network 5, according to an example embodiment. A new subscriber "P1" can operate his or her physical network device (88a of FIG. 5) to cause the processor circuit 92 of the physical network device 88a to download and install, for example via an external data network 96 distinct from the secure peer-to-peer data network 5, an executable application (e.g., an "app") that includes a desired application (e.g., a messenger application 72 of FIG. 3) and the network operating system (NOS) 56.

A new subscriber "P1" as a "requesting party" can enter via the device interface circuit 90 of the physical network device 88a a command that causes the processor circuit 92 to start ("instantiate") the executable application executing the secure private core network operations 56 on the physical network device 88a as an endpoint device "A" 12, causing an account management service executed in the secure network services 76 to prompt the new subscriber "P1" to register by entering an external network address such as a valid email address of the new subscriber "P1" (e.g., "P1@AA.com"), a mobile number used to receive text-based or image-based messages, etc., where the external network address is used by the requesting party "P1" for reachability via an external data network 96 distinct from the secure peer-to-peer data network 5.

In response to the secure network services 76 (executed by the processor circuit 92 in the physical network device 88a) receiving in the request by the user "P1" to register the physical network device 88a as an endpoint device "A" 12, including the external network address (e.g., "P1@AA.com") of the user "P1", the processor circuit 92 of the physical network device 88a executing the account management service in the secure network services 76 on the endpoint device "A" 12 can respond to the external network address entry (e.g., email address) by causing the secure network services 76 to generate a unique private key "prvKeyP1_A" and a corresponding secure public key "KeyP1_A" for the requesting party "P1" on the new endpoint device "A" 12. The account management service executed in the secure network services 76 by the processor circuit 92 on the endpoint device "A" 12 can generate and send a registration request (containing the secure public key "KeyP1_A" and the external network address (e.g., email address "P1@AA.com")) 106a to a prescribed destination 108 associated with the secure private core network 10 (e.g., a destination email address "registerme@whitestar.io" owned by the secure private core network 10) that is reachable outside the secure private core network 10 via the external data network 96 (e.g., the Internet, a 5G carrier, etc.). Hence, the device interface circuit 90 of the physical network device 88a can output, via the external data network 96, the registration request 106a received from the processor circuit 92 executing the NOS 56 for transmission, via the external data network 96, to a physical network device 88b hosting a messaging service (e.g., email server "@AA.com") for the subscriber "P1"; the messaging server 88b can forward the message 106a, via the external data network 96, to a physical network device 88c hosting a messaging service (e.g., email server "@whitestar.io") associated with the secure private core network 10 of the secure peer-to-peer data network 5.

The prescribed destination 108 of the registration request 106a can be hosted by the same physical network device 88c receiving the registration request 106a from the transmitting messaging server 88b or a different physical network device (e.g., 88d) in the secure private core network 10 (e.g., within a replicator device 16). The physical network device (e.g., 88c or 88d) hosting the prescribed destination 108 can cause its processor circuit 92 to execute a distributed search (DS) agent 82 in order to execute fraud control using the AI-based security service 64, including determining whether the external network address (e.g., email address "P1@AA.com") specified in the registration request 106a has been previously been used for any registration in the secure private core network 10, whether the external network address has been previously outcasted or "banned" by another subscriber or any AI-based security service 64 as owned by an untrusted party, etc.; the distributed search (DS) agent 82 (executed in the physical network device 88c or 88d) having received the registration request 106a can limit the scope in the availability of the external network address to prevent the MCP device 14 from obtaining any external network address (e.g., email address) "in the clear", for example based on limiting any validation of email addresses to only hashes of email addresses, described below.

In response to detecting that the external network address (e.g., email address) in the registration request is a new external network address and does not appear to be fraudulent, the distributed search (DS) agent 82 (executed in the physical network device 88c or 88d) that executed the fraud control can validate that the external network address can be trusted: in response, the distributed search (DS) agent 82 can cause the secure private core network 10 to generate and send a validation response (e.g., email message, text message, etc.) 114a to the external network address of the new subscriber "P1" (e.g., email "P1@AA.com" hosted by the physical network device 88b) via the external data network 96, where the validation message 114a can include the secure public key "KeyP1_A" generated by the secure network services 76 on the new device "A" 12: the secure public key "KeyP1_A" supplied in the registration request can be expressed in the validation message 114a in different forms, for example a QR code, a URL, or a text string.

Hence, the new subscriber "P1" can utilize the physical network device 88a (or another physical network device 88, as appropriate) to retrieve the validation response from the messaging server 88b "out of band" (i.e., outside the secure private core network 10): the validation response 114a specifies instructions enabling the new subscriber "P1" to submit the secure public key "KeyP1_A" for validation by the secure network services 76 executed on the new device "A" 12, for example in the form of a machine readable QR code, a URL link, or a machine-readable text string.

In response to the secure network services 76 executed on the new device "A" 12 (by the processor circuit 92 of the physical network device 88a) verifying the secure public key "KeyP1_A" in the validation response 114a sent to the external network address of the new subscriber "P1" (e.g., "P1@AA.com"), the secure network services 76 can verify the identity of the new subscriber "P1" using the new device "A" 12 as a legitimate owner of the external network address (e.g., "P1@AA.com") that has been determined as trusted through the above-described fraud control testing. The secure network services 76 executed on the new device "A" 12 also can respond to verifying the secure public key "KeyP1_A" by registering the physical network device 88a as the endpoint device "A" 12 based on auto-generating (crypto-generating) a verified identity in the form of a federation ID "F1" 18 that is allocated to the email address "P1@AA.com" used by the subscriber "P1", thereby establishing a trusted relationship between the trusted email address "P1@AA.com" and the endpoint device "A" 12. The network operating system 56 executed in the endpoint device "A" 12 (within the physical network device 88a) executes registration also based on prompting the new subscriber "P1" to create a new password for entry into the secure data network 5, and by auto-generating (crypto-generating) an endpoint ID 20 for the endpoint device "A" 12 that is a 128 bit UUID (e.g., "EID_A"; "E1" in FIG. 2). The creation of a new password by the network operating system 56 ensures that the requesting party "P1" retains exclusive "ownership" (i.e., possession and control) of the endpoint device "A" 12, and thus establishes a two-way trusted relationship between the requesting party "P1" and the corresponding network device "A" based on the requesting party retaining possession and control of the network device.

If the physical network device 88a is to be shared with a second user (e.g., "P3"), then the network operating system 56 can establish a second "profile" for the second user "P3", enabling the second user "P3" to register via the identity management system as described herein for creation of a different federation ID (e.g., "F6") 18 and a different endpoint ID (e.g., "E6") 20 for the same physical network device; in this case, the endpoint object 22 specifying the endpoint ID (e.g., "E6") 20 for the physical device used by the second user "P3" can include a reference indicating the physical network device is shared separately by two federations (e.g., "F1" and "F6"); as apparent from the foregoing, there is no sharing between the two federations sharing the same physical network device unless a two-way trusted relationship is established between the two federations (e.g., "F1" and "F6") according to the prescribed secure salutation protocol.

Hence, the network operating system 56 executed in the endpoint device "A" 12 (by the processor circuit 92 of the physical network device 88a) can store in the memory circuit 94 of the endpoint device "A" 12 a federation object 32 that comprises the federation ID 18 and the endpoint object 22 having an endpoint ID "E1" 20 that uniquely identifies the endpoint device "A" 12 in the secure private core network 10. The federation object 32 stored in the endpoint device "A" 12 identifies the federation "F1" 34 within the secure private core network 10.

The network operating system 56 executed in the endpoint device "A" 12 also can generate a cryptographic nonreversible hash of the external network address (e.g., email address "P1@AA.com"), for example "HASH [P1@AA.com]", that is considered in the secure private core network 10 an acceptable identifier for the federation 34 that is also identified by the federation ID "F1". The nonreversible hash of the external network address guarantees anonymity of the user "P1" while maintaining absolute identity control; hence, an email address of an existing federation 34 can be protected against subsequent registration requests based on utilizing the nonreversible hash of the email address.

The network operating system 56 executed in the endpoint device "A" 12 can identify the MCP device 14 as a prescribed management agent in the secure peer-to-peer data network 5, establish a connection with the MCP device 14 (e.g., via an IPv4 and/or IPv6 address that is created and/or obtained by the network operating system 56 executed in the endpoint device "A" 12), and generate and supply in operation 124 a registration message 126*a* comprising its cryptographic nonreversible hash (e.g., its hashed email address "HASH[P1@AA.com]"), its federation ID "F1" 18, and its endpoint ID "EID_A" that is owned by the federation ID "F1" (e.g., "HASH[P1@AA.com]→F1" and "F1→ ['HD_A']") (the network operating system 56 executed in the endpoint device "A" 12 also can include its public key "KeyP1_A"). The registration message 126*a* also can include one or more network addresses (e.g., IPv4/IPv6 addresses) obtained and used by the endpoint device "A" 12 for communications via a data network 96 as a multi-hop transport layer (60 of FIG. 3) underlying the secure peer-to-peer data network 5. The registration message also can specify an "alias" used by the endpoint device "A" 12 as a reference for identifying a keypair (e.g., "KeypairP1_A"), where the network operating system 56 executed in the endpoint device "A" 12 can generate multiple private/public key pairs having respective aliases, for example different cohorts, different data flows, etc.

The processor circuit 92 of the physical network device 88*e* executing the MCP device 14 can respond to receiving the registration message 126*a* by causing its distributed search (DS) agent (82 of FIG. 1) to execute in operation 130 a projection search on the supplied identifiers "HASH [P1@AA.com]", "F1" 18 and/or "EID_A" 20 to determine if there are any matches. For example, the distributed search (DS) agent 82 can execute a projected search of the cryptographic nonreversible hash "HASH[P1@AA.com]" to determine if there is a match indicating the cryptographic nonreversible hash (generated using the same external network address) has already been used for an existing federation identifier 18 that is already registered in the secure peer-to-peer data network 5.

In response to the distributed search (DS) agent 82 finding no other matches, the MCP device 14 in operation 132 can register the new federation 34. Hence, the registration message 126*a* enables the MCP device 14, as the prescribed management agent for the secure data network 5, to associate the federation ID "F1" 18 as owning the cryptographic hash "HASH[P1@AA.com]" and the endpoint identifier "EID_A" 20; the registration message 126*a* further enables the MCP device 14 to associate the secure public key "KeyP1_A" with the endpoint identifier "EID_A" 20 owned by the federation ID "F1" 18. As described below, the registration message enables the MCP device 14 to generate and store in operation 132 a data structure, referred to as a device identity container or "signet", that comprises the secure public key "KeyP1_A" of the endpoint device "A" 12, the "alias" used by the endpoint device "A" 12, a list of one or more network addresses (e.g., IPv4/IPv6 addresses) usable by the endpoint device "A" 12 for communications via an underlying data network 96 used as a multi-hop transport layer 60, and the endpoint ID "EID_A" 20 of the endpoint device "A" 12. Hence, the "signet" for the endpoint device "A" can provide a secure identification of the endpoint device "A" 12 that belongs to the federation "F1" 34 in the secure data network 5. If desired, the "signet" for the endpoint device "A" 12 also can include the federation ID "F1" 18.

In an alternate embodiment, the network operating system 56 executed in the endpoint device "A" 12 can generate the "signet" (containing the secure public key "KeyP1_A", the alias associated with the secure public key "KeyP1_A", the endpoint ID "EID_A", and any IPv4/IPv6 addresses in use by the endpoint device "A", and optionally the Federation ID "F1" 18), and include the "signet" in the secure registration request 126 sent to the MCP device 14 in operation 124. The MCP device can cause the projection search as described previously to verify the federation ID "F1" 18 is not already registered.

The MCP device 14, in response to determining there are no matches on the supplied identifiers "HASH [P1@AA.com]", "F1" 18 and/or "EID_A" 20 (indicating an absence of any previous use of the cryptographic nonreversible hash), can acknowledge the registration message based on generating and sending to the endpoint device "A" 12 a secure registration acknowledgment 136 indicating that there are no other endpoints, and can include an "MCP signet" (containing at least the public key "Key_MCP" and corresponding alias of the MCP device 14, and optionally the endpoint ID and IPv4/IPv6 addresses) and the "A" signet of the endpoint device "A" for distribution to other network devices, described below; the MCP device 14 can encrypt at least the public key "Key_MCP" (and optionally the "MCP" signet and the "A" signet) with a temporal key (resulting in the encrypted data structure "ENC(Key_MCP)"), encrypt the temporal key with the secure public key "KeyP1_A" of the endpoint device "A" 12, and supply the encrypted temporal key "ENC(TK)" in the secure registration acknowledgment 136 with the encrypted data structure "ENC(Key_MCP)" to the endpoint device "A" 12. The supplied identifiers "HASH[P1@AA.com]", "F1" and "EID_A" also can be supplied by the MCP device 14 to the directory server 28 for subsequent projection searches in the secure private core network 10.

The network operating system 56 of the endpoint device "A" 12 can receive the secure registration acknowledgment 136 containing a first encrypted portion ("ENC(TK)") and a second encrypted portion "ENC(Key_MCP)". The supply of the encrypted temporal key "ENC(TK)" with the encrypted acknowledgment "ENC(Key_MCP)" in the secure registration acknowledgment 136 enables the network operating system 56 executed in the endpoint device "A" 12 to decrypt the temporal key "TK" using its private key "prvKeyP1_A", decrypt the acknowledgment using the decrypted temporal key "TK", and obtain the secure public key "Key_MCP" of the MCP device 14. Hence, the sharing of secure public keys between the endpoint device "A" 12 and the MCP device 14 establishes a two-way trusted relationship between the endpoint device "A" 12 and the MCP device 14 in the secure private core network. If received from the MCP device 14, the network operating system 56 of the endpoint device "A" 12 can store the "MCP" signet for subsequent communications with the MCP device 14, and can further store the "A" signet for distribution to other devices for initiating the secure salutation protocol, described below.

Hence, at this stage the federation object 32 contains only the endpoint object 22 having an endpoint ID "E1" 20 that uniquely identifies the endpoint device "A" 12 used for initial registration with the secure private core network 10.

The same user "P1" can register a physical network device 88f as a new device "A1" 12 based on installing and instantiating the network operating system 56 on the physical network device 88f, and entering the same external network address (e.g., email address "P1@AA.com") of the subscriber "P1" in response to a prompt by the account management service executed in the secure network services 76 of the network operating system 56; the account management service executed in the secure network services 76 on the physical network device 88f can respond to reception of the external network address (e.g., email address "P1@AA.com") by causing the secure network services 76 to generate a unique private key "prvKeyP1 A1" and a public key "KeyP1 A1" for the user "P1" on the new device "A1" 12, and generate and send the registration request (containing the secure public key "KeyP1 A1") 106b to the prescribed destination (e.g., "registerme@whitestar.io") 108 associated with the secure peer-to-peer data network 5.

As described previously, receipt of the registration request 106b causes a physical network device (e.g., 88c or 88d) executing the distributed search (DS) agent 82 in the secure per-to-peer data network 5 to execute fraud control, for example based on determining an inordinate number of registration requests 106. The distributed search (DS) agent 82, having received the registration request, can limit the scope of searching the external network address (e.g., the email address) to prevent the MCP device 14 from obtaining the external network address "in the clear", and can generate and send a validation response 114b to the external network address (e.g., email address "P1@AA.com") of the subscriber "P1", where the validation response can include the secure public key "KeyP1 A1" generated by the secure network services 76 on the new device "A1" 12.

The subscriber "P1" can receive the validation response 114b that specifies instructions (e.g., QR code, URL, text string, etc.) for submitting the included secure public key "KeyP1 A1" for validation. In response to the secure network services 76 executed on the new device "A1" 12 verifying the secure public key "KeyP1_A1" in the validation response 114b, the secure network services 76 executed on the new device "A1" 12 can (temporarily) auto-generate a federation ID "FA1" 18 that is allocated to the external network address (e.g., email address "P1@AA.com") used by the subscriber "P1", establishing a secure relationship between the external network address (e.g., email address "P1@AA.com") and the endpoint device "A1" 12. The network operating system 56 executed in the endpoint device "A1" 12 also can respond to verifying the secure public key "KeyP1_A1" in the validation response 114b by prompting the subscriber "P1" to create a new password for entry into the secure data network 5 via the new device "A1" 12, and by auto-generating (crypto-generating) an endpoint ID 20 for the endpoint device "A1" 12 that is a 128 bit UUID (e.g., "E2" in FIG. 2).

Hence, the network operating system 56 executed in the endpoint device "A1" 12 can store in the memory circuit 94 of the endpoint device "A1" 12 the federation object 32 that comprises the endpoint object 22 specifying the federation ID "FA1" 18 and having an endpoint ID (e.g., "EID_A1") 20 that uniquely identifies the endpoint device "A1" 12 in the secure private core network 10. The federation object 32 stored in the endpoint device "A1" 12 identifies the federation ID "FA1" 18 within the secure private core network 10.

The network operating system 56 executed in the endpoint device "A1" 12 also can generate a cryptographic nonreversible hash of the external network address (e.g., the email address "P1@AA.com"), e.g., "HASH[P1@AA.com]", connect to the MCP device 14 (e.g., via an IP address that is made available to the network operating system executed in the endpoint device "A1" 12), and supply a registration message 126b (operation 124 of FIG. 5). The registration message 126b generated by the endpoint device "A1" 12 can specify the cryptographic nonreversible hash "HASH[P1@AA.com]", its federation ID "FA1" 18, and its endpoint ID "EID_A1" that is owned by the federation ID "FA1" (e.g., "HASH[P1@AA.com]→FA1" and "FA1→['ETD_A1']") (the network operating system 56 executed in the endpoint device "A" 12 also can include its public key "KeyP1_A1"). The network operating system 56 executed in the endpoint device "A1" 12 also can add to the registration message 126b one or more network addresses used for communications via an underlying data network 96 used as a multi-hop transport layer (60 of FIG. 3).

The MCP device 14 can respond to reception of the registration message from the endpoint device "A1" 12 by causing its distributed search (DS) agent 82 to execute in operation 130 of FIG. 5 a projection search on the supplied identifiers "HASH[P1@AA.com]", "FA1" and/or "EID_A1".

In response to determining a match on the cryptographic nonreversible hash "HASH[P1@AA.com]", the distributed search (DS) agent 82 can cause the MCP device 14 to generate an "A1" signet containing the public key "KeyP1_A1", the corresponding alias for the public key "KeyP1_A1", the endpoint ID "EID_A1", and the list of zero or more IPv4/IPv6 addresses for reaching the endpoint device "A1". The MCP device 14 can generate and output to the endpoint device "A1" 12 in operation 142 a secure endpoint acknowledgment 144 indicating another endpoint device "A" 12 exists in its federation 34; the acknowledgment can include the "A" signet of the endpoint device "A" 12 that is already a member of the same federation 34, the "A1" signet for use by the endpoint device "A1" 12 for sharing with other network devices, and the "MCP" signet of the MCP device 14. As described previously, the "A" signet of the endpoint device "A" 12 can include: the secure public key "KeyP1_A" of the endpoint device "A" 12, an "alias" used by the endpoint device "A" 12, reachability information such as a list of one or more IPv4/IPv6 addresses usable by the endpoint device "A" 12, and the endpoint ID 20 of the endpoint device "A" 12.

As described previously, the MCP device 14 can encrypt the endpoint acknowledgment (containing the "A" signet of the endpoint device "A" 12, the "A1" signet of the endpoint device "A1" 12, and at least the secure public key "Key_MCP" or the "MCP signet") with a temporal key, encrypt the temporal key with the secure public key "KeyP1_A1" of the endpoint device "A1" 12, and supply the encrypted temporal key in the secure endpoint acknowledgment 144 to the endpoint device "A1" 12. The supplied identifiers "HASH[P1@AA.com]", "F1" and "EID_A1" also can be supplied to the directory server 28 for subsequent projection searches in the secure private core network 10.

The encrypted temporal key in the secure endpoint acknowledgment 144 received by the endpoint device "A1" 12 enables the guardian security agent 66 in the network operating system 56 executed in the endpoint device "A1" 12 to decrypt the temporal key, decrypt the acknowledgment, and obtain at least the secure public key "Key_MCP" of the MCP device 14 (and optionally the "MCP" signet).

The guardian security agent 66 in the network operating system 56 executed in the endpoint device "A1" 12 can respond to the decrypted acknowledgment (specifying another endpoint is a member of the same federation 34, and that contains the "A" signet for the endpoint device "A" 12 and the "A1" signet) by initiating a prescribed secure salutation protocol with the endpoint device "A" 12. In particular, the secure network service 76 executed in the endpoint device "A1" 12 can generate and send, based on the received "A" signet and "A1" signet, a secure salutation request 148 that contains the "A1" signet identifying its endpoint ID "EID_A1" 20 and requesting a relationship with the endpoint device "A" 12; the salutation request can be encrypted using the secure public key "KeyP1_A" of the endpoint device "A" 12; as described previously, the "A1" alias included with the salutation request can include the alias (associated with the secure public key "KeyP1_A"), and also can include the secure public key "KeyP1_A1" of the endpoint device "A1" 12, and optionally the IPv4/IPv6 addresses for reaching the endpoint device "A1" 12.

The endpoint device "A" 12 can "automatically" respond back with the endpoint device "A1" 12, for example the network operating system 56 executed in the endpoint device "A1" 12 can infer that the endpoint device "A" 12 and the endpoint device "A1" 12 are in the same federation based on a determined match of the hashed external network addresses (e.g., email addresses: for example, a search by a distributed search (DS) agent 82 on a hash of the email address can return the endpoint IDs for both the endpoint device "A" 12 and the endpoint device "A1" 12.

Hence, the network operating system 56 executed in the endpoint device "A" 12 can respond to the salutation request by sending a secure salutation reply (e.g., a salutation acceptance) 150 that includes the endpoint object 22 of the endpoint device "A" 12: the salutation reply 150 can be encrypted as described above using a temporal key that is further encrypted using the secure public key "KeyP1_A1", for formation of a secure salutation reply (e.g., secure salutation acceptance). The network operating system 56 executed in the endpoint device "A" 12 also can store the "A1" signet.

Hence, the network operating system 56 executed in the endpoint device "A1" 12 can determine from the endpoint object 22 of the endpoint device "A" 12 specified in the secure salutation reply 150 received that the endpoint object 22 specifies a federation ID "F1" 18: the federation ID "F1" 18 in the endpoint object 22 in the salutation acceptance 150 causes the network operating system 56 in the endpoint device "A1" 12 to determine that the endpoint device "A" 12 pre-existed in the secure private core network 10; hence, the network operating system 56 in the endpoint device "A1" 12 can establish a two-way trusted relationship with the endpoint device "A" 12 based on exchange of the public keys "KeyP1_A" and "KeyP1_A1", and in response re-associate its federation ID from "FA1" to "F1" in its endpoint object 22, and discard the initial federation ID "FA1". Consequently, the network operating system 56 in the endpoint device "A1" 12 adopts the federation ID "F1" 18, thus establishing the identity of the owner of the devices "A" and "A1" as federation"F1" 34. Hence, the endpoint device "A1" 12 in its corresponding endpoint object 22 adopts the identity, user name, user image, etc. of the same user as in the endpoint device "A" 12 (as identified by its corresponding endpoint ID 20).

Hence, the secure private core network 10 can establish that the federation "F1" 34 owns the endpoint devices "A" and "A1" 12; moreover, a cohort is established between the endpoint devices "A" and "A1" 12 based on sharing cryptographic keys, such that any content created on one endpoint (e.g., endpoint device "A" 12) can be autonomically and securely replicated to the other endpoint (e.g., endpoint device "A1" 12) by the autonomic synchronizer 52. Since the synchronization process in the secure private core network 10 is aware of all the federations 34, any connection by an existing endpoint device 12 in a federation 34 to a new endpoint device 12 or a new federation 34 can cause autonomic replication of the connection to the other devices in the existing federation 34 or the new federation 34 by the associated autonomic synchronizer 52. According to example embodiments, an identity management system can utilize signets for establishment of two-way trusted relationships in a secure peer-to-peer data network based on ensuring each identity is verifiable and secure, including each federation identity that creates a verified association with an identified external network address used by a requesting party, and each endpoint identifier that is cryptographically generated and associated with a federation identity, enabling a federation identity to own numerous endpoint identifiers for aggregation of two-way trusted relationships in the secure peer-to-peer data network. Additional details regarding the identity management system are disclosed in commonly-assigned, copending application Ser. No. 17/343,268, filed Jun. 9, 2021, entitled "IDENTITY MANAGEMENT SYSTEM ESTABLISHING TWO-WAY TRUSTED RELATIONSHIPS IN A SECURE PEER-TO-PEER DATA NETWORK", the disclosure of which is incorporated in its entirety herein by reference.

Distributed Crypto-Signed Switching in a Secure Peer-to-Peer Network Based on Device Identity Containers Device identity containers ("signets") also can be used for establishing the secure storage and transmission of data structures across different "federations" of network devices, including endpoint devices (established by different users having established respective two-way trusted relationships with the secure peer-to-peer data network), and replicator devices, according to the prescribed secure salutation protocol under the control of the AI based security suite 64. Hence, crypto-signed switching can be enabled between two-way trusted network devices in a secure peer-to-peer data network, according to the prescribed secure salutation protocol under the control of the AI based security suite. Additional security-based operations can be deployed in a scalable manner in the secure peer-to-peer data network, based on the distributed execution of the AI-based security suite 64.

The guardian security agent 66 can secure (i.e., encrypt) all "at-rest" data structures as first secure data structures for secure storage in the network device, for example based on encrypting each "at-rest" data structure with a corresponding private key: for example, the guardian security agent 66 executed in the endpoint device "A" 12 can secure the "at-rest" data structures using the private key "prvKeyP1_A" that can be dynamically generated by the guardian security agent 66 during initialization of the network operating system 56. The guardian security agent 66 (executed, for example, by the endpoint device "A" 12) also can secure "in-flight" data structures as second secure data structures based on dynamically generating a temporal key "TK", and encrypting the temporal key 68 with a public key (e.g., "Key_B") of a destination device (e.g., the endpoint (device "B" 12, ensuring secure communications in the secure peer-to-peer data network 5. Additional details regarding encrypting "at rest" data structures and "in-flight" data structures are described below, and are also disclosed in the above-incorporated U.S. Publication No. 2021/0028940.

In particular, the guardian security agent 66 of a source network device (e.g., an endpoint device "A" 12) can encrypt an "in-flight" data packet into a secure data packet based on dynamically generating a unique temporal key (e.g., "TK") used for encrypting a data packet payload into an encrypted payload, and encrypting the unique temporal key into an encrypted temporal key (e.g., "ENC(Key_B) [TK]") using a secure public key (e.g., "Key_B") of a destination device (e.g., endpoint device "B" 12) identified within a destination address field (e.g., "DEST=B"). In other words, the guardian security agent 66 of the source endpoint device dynamically generates a new temporal (e.g., time-based) key "TK" for each secure data packet to be transmitted, ensuring no temporal key is ever reused; moreover, the encrypted temporal key ensures that only the destination device can decrypt the encrypted temporal key to recover the temporal key used to encrypt the payload.

The guardian security agent 66 of a source network device (e.g., an endpoint device "A" 12) also can digitally sign the packet (containing the encrypted payload and encrypted temporal key) using the endpoint device A's private key "prvKeyP1_A" to generate a source endpoint signature. Hence, the guardian security agent 66 can generate the secure data packet for secure "in-flight" communications in the secure peer-to-peer data network 5.

Figure 6:
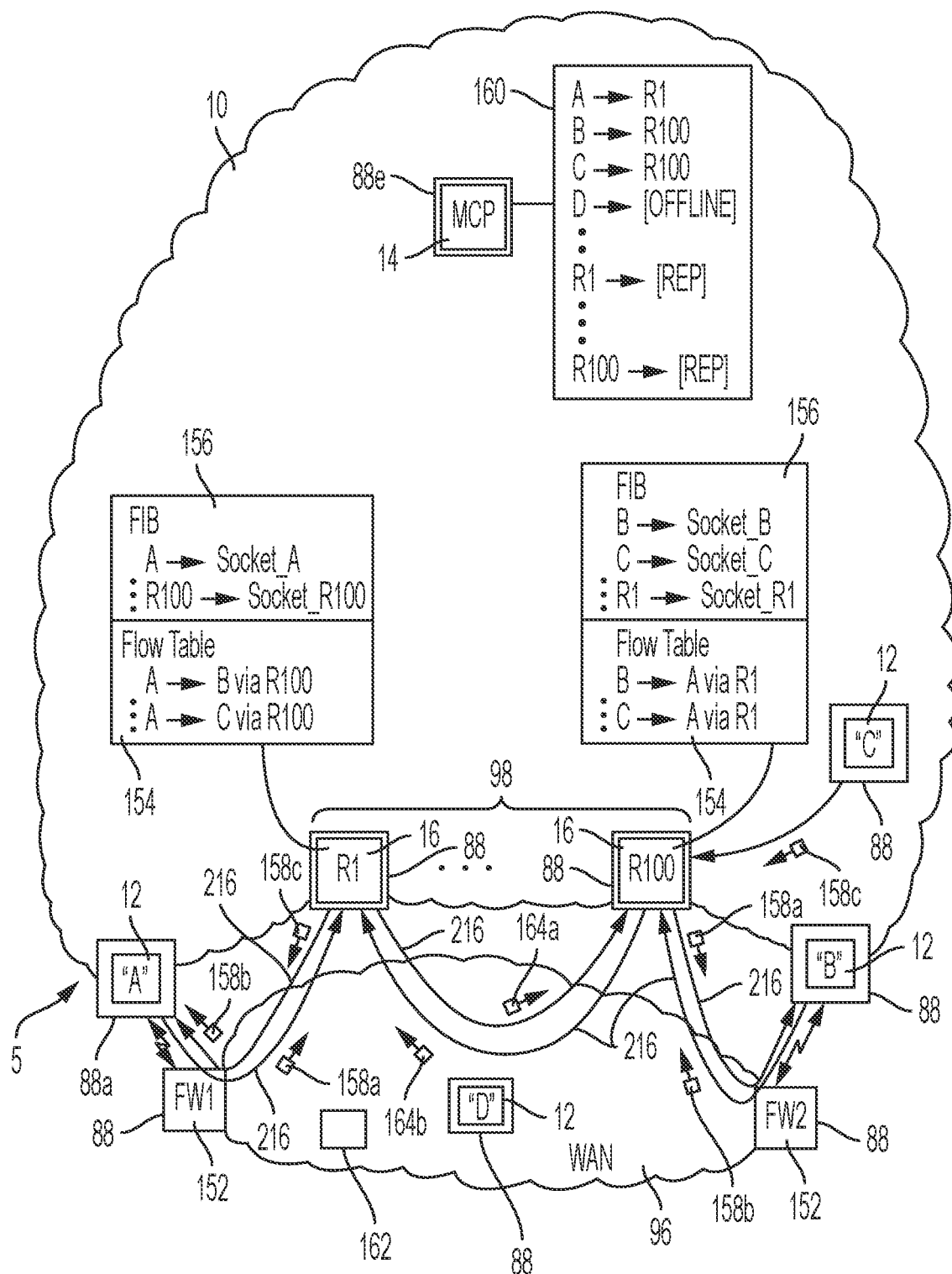
FIG. 6 illustrates secure communications between two-way trusted network devices in a secure peer-to-peer data network, according to an example embodiment.

The source endpoint signature generated by the guardian security agent 66 in the source network device (e.g., the endpoint device "A" 12) enables the guardian security agent 66 of a receiving network device (e.g., the replicator device "R1" 16, and/or the endpoint device "B" 12 of FIG. 6) in possession of the public key "KeyP1_A" to validate that the secure data packet is from the endpoint device "A" 12. The guardian security agent 66 of the receiving network device also can validate an incoming secure data packet based on determining that the receiving network device (e.g., the replicator device "R1" 16, and/or the endpoint device "B" 12 of FIG. 6) has a two-way trusted relationship with the source network device as described above, where the source network device can be identified by the source address field "SRC=A".

Hence, the guardian security agent 66 of a receiving network device (e.g., the replicator device "R1" 16 or the endpoint device "B" 12 in FIG. 6) can validate an identity for a received secure data packet 158, based on validating a source endpoint signature using the corresponding public key (e.g., "KeyP1_A") of the source network device (e.g., the endpoint device "A" 12), and based on the guardian security agent 66 of the receiving network device determining that it has a two-way trusted relationship with the source network device identified in the source address field.

The guardian security agent 66 of each of the replicator devices "R1" and "R100" 16 also can enforce crypto-signed switching based on validation of a replicator signature. In particular, following validation of the secure data packet 158, the guardian security agent 66 of the replicator device (e.g., "R1") 16 can cryptographically sign the secure data packet, using its private key "prvKey_R1" to generate a replicator signature for secure transmission to its trusted peer replicator device "R100" 16 as a secure forwarded packet (e.g., 164a) containing the secure data packet (e.g., 158a) and the replicator signature, ensuring no unauthorized network node 162 in the underlying external data network 96 can decrypt the secure data packet (e.g., 158a) contained in the secure forwarded packet (e.g., 164a).

Similarly, the guardian security agent 66 of a replicator device (e.g., "R100") 16 can determine that the cryptographically-signed secure forwarded packet (e.g., 164a of FIG. 6) is received from a trusted peer replicator device (e.g., "R1") 16, and can execute validation of the secure forwarded packet (e.g., 164a) based on verifying the replicator signature in the secure forwarded packet using the public key "Key_R1" of the replicator device "R1" 16. As described below, the guardian security agent 66 and/or the sentinel security agent 68 of the replicator device (e.g., "R100") can verify the secure forwarded packet is not a replay attack. The replicator device (e.g., "R100") can respond to successful validation of the secure forwarded packet (containing the secure data packet 158a) by forwarding the secure data packet (e.g., 158a) to its attached destination endpoint device (e.g., "B") 12, maintaining the cryptographic security of the secure data packet (e.g., 158a) for decryption by the attached destination endpoint device "B" 12 following validation of the secure data packet (e.g., 158a) by the guardian security agent 66 in the destination endpoint device "B" 12.

Hence, the guardian security agent 66 can validate identities for establishment and enforcement of all two-way trusted relationships, including during execution of the prescribed secure salutation protocol as described previously.

The secure network services 76 executed in each physical network device 88 also includes a sentinel service 68. The sentinel service 68 is implemented in each physical network device 88 as executable code (e.g., an executable "agent") within the secure network services 76; hence, the sentinel service 68 also can be referred to herein as a sentinel agent 68.

The navigator security agent 70 of an endpoint device (e.g., the endpoint device "A" 12) can enable secure communications to be established through a firewall (e.g., "FW1" 152 of FIG. 6) of a locally-utilized wireless data network, based on establishing a two-way trusted relationship with a replicator device (e.g., "R1" 16) in the secure peer-to-peer data network 5, for example according to the prescribed secure salutation protocol. As illustrated in FIG. 6, the "mesh" 98 of interconnected replicator devices 16 enables the replicator device "R1" 16 to provide reachability to the destination network device "B" via a second replicator device "R100" 16.

In particular, the crypto-signed switching described herein is based on the MCP device 14, as the prescribed management agent in the secure peer-to-peer data network 5, tracking a connection status 160 of every network device in the secure peer-to-peer data network 5, including each endpoint device 12 and each replicator device 16. The MCP device 14 establishes a pairwise topology (e.g., a mesh) 98 of two-way trusted replicator devices 16 based on causing the guardian security agent 66 of each replicator device 16, during registration with the MCP device 16, to execute a prescribed secure salutation protocol with each and every other replicator device 16 in the secure private core network 10.

The replicator device "R1" 16 upon joining the secure private core network 10 can generate for itself a secure private key "prvKey_R1" and a corresponding public key "Key_R1". The replicator device "R1" 16 can securely register with the MCP device 14 as described previously.

The processor circuit 92 of the physical network device 88*e* executing the MCP device 14 can update a table of connection status entries 160 of all endpoint devices 12 registered with the secure private core network 10; the table also can store connection status entries 160 for registered replicator devices 16. Each connection status entry 160 for an endpoint device 12 can specify a corresponding next-hop replicator identifier (if available) for each corresponding endpoint device 12, or an "offline" state indicating the endpoint device 12 is not reachable in the secure data network 5. The connection status entry 160 enables the MCP device 14 to identify a replicator device 16 that an endpoint device 12 should connect to (e.g., based on load balancing, locality, etc.). As described below, the connection status entries 160 enables the MCP device 14 to identify a "next hop" replicator device for reaching a destination endpoint device 12. Since the MCP device 14 is attached to every replicator device 16, each replicator device 16 has a corresponding connection status entry 160.

Hence, the MCP device 14 can respond to the secure registration of the replicator device "R1" 16 by sending a secure acknowledgment: the secure acknowledgment can contain one or more signets (e.g., the "R100" signet and the "R1" signet) containing secure public keys of existing replicator devices (e.g., "R100").

In response to receiving the secure acknowledgement containing the "R100" signet, the network operating system 56 executed in the replicator device "R1" can establish a two-way trusted relationship with at least the replicator device "R100" 16 using its corresponding "R100" signet containing its corresponding public key "Key_R100", enabling formation of the pairwise topology 98 of two-way trusted replicator devices 16.

In particular, the processor circuit 92 of the physical network device 88 executing the replicator device "R1" 16 can validate the secure acknowledgment as described herein, and establish a two-way trusted relationship with the replicator device "R100" 16 according to the prescribed secure salutation protocol by sending a secure salutation request using the public key "Key_R100"; the replicator device "R1" 16 also can include in the secure salutation request its "R1" signet containing its public key "Key_R1". The replicator device "R100" 16 in response can either automatically accept the secure salutation request (based on decrypting using its private key "prvKey_R100", and based on and the replicator device "R100" 16 receiving the "R1" signet from the MCP device 14), alternately the replicator device "R100" 16 can verify with the MCP device 14 that the replicator device "R1" 16 is a trusted replicator device, and in response generate and send to the replicator device "R1" 16 a secure salutation reply for establishment of the two-way trusted relationship between the replicator device "R1" 16 and the replicator device "R100" 16.

The replicator device "R1" 16 can repeat the establishing of a two-way trusted relationship with each and every available replicator device 16, based on a corresponding signet received from the MCP device 14.

Hence, according to example embodiments the device identity containers ("signets") provide a secure identification of replicator devices "R1" to "R100" 16, for establishment of two-way trusted relationships between the replicator devices 16 and formation of the pairwise topology 98. The establishment of a secure path based on an aggregation of trusted peer connections enable the establishment of secure network communications in the secure data network 5 via the pairwise topology 98, without any need for any additional security considerations at the application layer (58 of FIG. 3).

The device identity containers ("signets") also can be used to establish two-way trusted relationship between an endpoint device 12 and a replicator device 16, enabling formation of the secure data network 5 based on the aggregation of secure, two-way trusted relationships along each logical hop of the secure data network 5.

The endpoint device "A" 12 can connect to the secure private core network 10 based on generating and sending a secure replicator attachment request to the MCP device 14 via a prescribed IP address utilized for reaching the MCP device 14 via the external data network 96 (60 in FIG. 3), and/or using the "MCP" signet. The secure replicator attachment request "RQ_A" can be encrypted as described previously, and digitally signed by the endpoint device "A" 12.

The MCP device 14 can digitally verify the signature of the secure replicator attachment request "RQ_A" (using its stored copy of endpoint device A's public key "KeyP1_A"), and decrypt the replicator attachment request using the MCP private key (and the decrypted temporal key). The load balancer (62 of FIG. 1) executed in the MCP device 14 can execute a discovery process that assigns each endpoint device 12 an attachment to a replicator device 16 in the secure private core network 10.

In response to the load balancer 62 identifying the replicator device "R1" 16 for allocation to the endpoint device "A", the MCP device 14 can generate a secure replicator attachment response based on generating a replicator attachment response that includes the "R1" signet of the replicator device "R1" 16: as described previously, the "R1" signet of the replicator device "R1" 16 can include the secure public key "Key_R1" of the replicator device "R1" 16, a corresponding alias to be used by the replicator device "R1" 16 to identify the public key "Key_R1" that is in use, reachability information such as a list of one or more IP addresses usable by the replicator device "R1" 16, and a replicator ID 20 of the endpoint device replicator device "R1" 16.

The replicator attachment response (including the "R1" signet of the replicator device "R1" 16) can be secured based on the MCP device 14 generating a new temporal key used for encrypting the replicator attachment response, encrypting the temporal key using the endpoint device A's public key "KeyP1_A", attaching the encrypted temporal key to the encrypted replicator attachment response, and digitally signing the packet (containing the encrypted replicator attachment response and encrypted temporal public key) using the MCP private key "prvKey_MCP".

The endpoint device "A" 12 can respond to reception of the secure replicator attachment response by digitally verifying the signature of the secure replicator attachment response (using its stored copy of the MCP device public key "Key_MCP"), decrypting the secure replicator attachment response using its private key "prvKeyP1_A" to decrypt the temporal key, and the decrypted temporal key, to recover the "R1" signet for the replicator device "R1" 16. As indicated previously, the "R1" signet of the replicator device "R1" 16 can include: the secure public key "Key_R1" of the replicator device "R1" 16, an "alias" used by the replicator device "R1" 16, reachability information such as a list of one or more IP addresses usable by the replicator device "R1" 16, and the endpoint ID 20 of the replicator device "R1" 16.

The endpoint device "A" 12 can respond to reception of the "R1" signet for the replicator device "R1" 16 by generating and sending a secure attachment request to the replicator device "R1" 16 according to the prescribed secure salutation protocol (secured as described above including an encrypted temporal key and signing of the salutation request by the private key "prvKeyP1_A"). The secure attachment request can be encrypted using the secure public key "Key_R1" of the replicator device "R1" 16, and can include the alias (associated with the secure public key "Key_R1"), and also can include the "A" signet (containing the secure public key "KeyP1_A") of the endpoint device "A" 12.

The network operating system 56 executed in the physical network device 88 executing the replicator device "R1" 16 can respond by validating the secure attachment request according to the prescribed secure salutation protocol, enabling the replicator device "R1" 16 to form a first party trust relationship with the endpoint device "A" based on sending a secure attachment acceptance that can include a corresponding endpoint object 22 that identifies the replicator device "R1" 16. The replicator device "R1" 16 can send a secure notification to the MCP device 14 indicating that the endpoint device "A" 12 has attached to the replicator device "R1" 16, causing the MCP device 14 to update the corresponding connection status entry 160 of the endpoint device "A" 12 as attached to a next-hop replicator device "R1" 16. Also note that the replicator device "R1" 16 can obtain the "A" signet from the MCP device 14 in response to identifying the endpoint device "A" 12, enabling further validation of the endpoint device "A" 12 prior to attachment.

Hence the endpoint device "A" 12 can establish a first-party trust two-way trusted relationship with the next-hop replicator device "R1" 16 based on creating (as a local data structure) a key pair association of its private key and the peer public key{"prvKeyP1_A", "Key_R1" } for securely sending data packets destined for the next-hop replicator device "R1" 16 and securely receiving data packets originated by the replicator device "R1" 16. Similarly, the replicator device "R1" 16 can establish the first-party two-way trusted relationship with the attached endpoint device "A" 12 based on creating (as a local data structure) a key pair association of {"prvKey_R1", "KeyP1_A" } for securely sending data packets destined for the attached endpoint device "A" 12 and securely receiving data packets originated by the attached endpoint device "A" 12.

The endpoint device "B" 12 (and/or "C" 12) also create a corresponding set of private/public keys, and securely register with the MCP device 14, causing the MCP device 14 to send a secure acknowledgement containing the "B" signet (generated, for example, by the MCP device 14).

The network operating system 56 executed in the endpoint device "B" can generate and send to the MCP device 14 a secure replicator attachment request that causes the MCP device 14 to allocate the replicator device "R100" 16 for attachment by the endpoint device "B" 12 (and/or "C" 12) by generating and sending back to the endpoint device "B" 12 (and/or "C" 12) a secure replicator attachment reply that includes the "R100" signet. The endpoint device "B" 12 (and/or "C" 12) can decrypt and recover the "R100" signet for the replicator device "R100" 16, and send to the replicator device "R100" 16 a secure attachment request for establishment of a first-party two-way trusted relationship with the replicator device "R100" 16. The replicator device "R100" 16 can respond to the secure attachment request from the endpoint device "B" 12 (and/or "C" 12) by generating and sending to the MCP device 14 a secure notification that the endpoint device "B" 12 (and/or "C" 12) has attached to the replicator device "R100" 16.

The endpoint device "B" 12 (of the federation "F2" 34) can respond to attaching to the replicator device "R100" 16 by sending to the replicator device "R100" 16 a secure query for reaching the owner of the federation "F1" 34, using for example an identifier received by the endpoint device "B" 12, for example based on email transmission of the endpoint identifier (implemented for example as a text string, URL string, and/or a QR code, etc.), machine scan of a QR code (generated by the endpoint device "A") detected by a camera of the endpoint device "B", etc.: the identifier can be any one of a hash of an email address used by the owner of the federation "F1" 34 as described above, the federation ID "F1" 18, and/or an endpoint ID (e.g., "EID_A") 20. If needed, the replicator device "R100" 16 can execute a crypto-switching (described below) and forward a secure forwarded request to the MCP device 14.

The MCP device 14 can respond to validation of the secure forwarded request (described previously) by executing a projection search on the identifier (e.g., "F1", "EID_A", and/or "HASH[P1@AA.com]"), and sending a secure response that contains the "A" signet and the "A1" signet of the respective endpoint devices "A" and "A1" belonging to the federation "F1" 34. Alternately, the replicator device "R100" can respond to the secure query from the endpoint device "B" 12 based on local availability of the "A" signet and the "A1" signet for the federation "F1" 34. The MCP device 14 and/or the replicator device "R100" also can specify in the secure response an online availability based on the connection status 160, indicating for example "A online" and "A1 offline".

Hence, the replicator device "R100" 16 can forward the secure response to the endpoint device "B" 12, enabling the endpoint device "B" to execute the prescribed secure salutation protocol with the endpoint device "A" in response to receiving the corresponding "A" signet of endpoint device "A" 12 and the indicator "A online" indicating the endpoint device "A" 12 is reachable via the secure peer-to-peer data network 5. As described previously, the endpoint device "B" 12 can generate a secure salutation request (158b of FIG. 6) that includes the "B" signet, and forward the secure salutation request 158b via its replicator device "R100".

As described previously, the secure salutation request 158b can specify an alias ("ALIAS_A") for the endpoint device "A" 12 (identified from A's signet obtained by the endpoint device "B" 12): the endpoint device "B" 12 can encrypt the payload salutation request using a dynamically-generated temporal key (TK), encrypt the temporal key (TK) using A's public key "KeyP1_A" and add the encrypted temporal key "ENC(KeyP1_A)[TK]" to the data packet that also contains the encrypted payload "ENC(TK) [PAYLOAD]"; the endpoint device "B" 12 also can digitally sign the data packet using its private key "prvKey_B" to generate a source endpoint signature, enabling other network devices in possession of the public key "Key_B" to verify the secure data packet is from the endpoint device "B" 12. Hence, the secure salutation request 158b cannot be decrypted by any device except the destination endpoint device "A" 12; consequently, the secure data packet 158b can secure the logical one-hop connection 216 between the endpoint device "B" 12 and the replicator device "R100" 16.

The replicator device "R100" 16 can validate the secure salutation request 158b, and in response determine that the destination endpoint device "A" 12 is reachable via the next-hop replicator device "R1" 16, causing the replicator device "R100" to generate and send a secure forwarded packet 164b, comprising the secure salutation request 158b, for secure transmission and delivery to its trusted peer replicator device "R1" 16. The replicator device "R1" 16 can respond to receiving the secure forwarded packet 164b by validating the secure forwarded packet 164b, and forwarding the secure data packet 158b to the destination endpoint device "A" 12 via the network socket connection "Socket_A" that provides the logical one-hop connection between the replicator device "R1" 16 and the endpoint device "A" 12.

Hence, the network operating system 56 of the endpoint device "A" can accept the secure salutation request 158b by storing the enclosed "B" signet, and generating and outputting to the endpoint device "B" 12 (via the replicator devices "R1" and "R100" 16) a secure salutation reply 158a.

The network operating system 56 executed in the endpoint device "B" also can send an online notification request for the endpoint device "A1" to its replicator device "R100". Depending on implementation, the replicator device "R100" (if executing distributed processing on behalf of the MCP device 14) and/or the MCP device 14 can record the online notification request, and generate and send to the endpoint device "B" 12 an updated online indicator in response to the endpoint device "A1" 12 connecting to a replicator device 16.

The updated online indicator indicating the status "A1 online" from the replicator device "R100" 16 can cause the network operating system 56 executed in the endpoint device "B" 16 to initiate and send to the endpoint device "A1" a secure salutation request (as described in detail previously) that contains the "B" signet. The secure salutation request can cause the network operating system 56 executed in the endpoint device "A1" to accept the salutation request, securely store the "B" signet, and send a salutation reply to the endpoint device "B" (via the replicator devices "R1" and "R100" 16).

Hence, the endpoint device "B" can establish a two-way trusted relationship with each of the endpoint devices "A" and "A1" 12 belonging to the federation "F1" 34, based on receiving the respective "A" signet and "A1" signet, merely based on identification of the federation "F1" 34 established for the user "P1". Similarly, the endpoint device "C" can initiate establishment of a two-way trusted relationship with the endpoint device "A" based on sending a secure salutation request within a secure data packet 158c to the endpoint device "A" via the replicator devices "R100" and "R1" (as a secure forwarded packet 164c) as described above.

The example embodiments also enable dynamic updates of each signet stored in the secure data network 5, for example if an endpoint device changes its public key ("re-keying") and associated alias, and/or changes its IPv4/IPv6 address reachability. As described previously, a change in a data structure (including a signet) can cause an instant update among two-way trusted network devices. Hence, the endpoint device "A" can cause an instant update of its "A" signet to the replicator device "R1" and/or its peer endpoint device "A1" within the same federation 34. The updated "A" signet can be forwarded by the endpoint device "A" to the endpoint device "B" (similarly, the replicator device "R1" can forward the updated "A" signet to the MCP device 14).

The network operating system 56 of the endpoint device "B" 12 also can establish a first-party two-way trusted relationship with the endpoint device "C" 12, for example based on executing the prescribed secure salutation protocol via a peer-to-peer connection that can be established while the endpoint devices "B" and "C" 12 are in local proximity to each other (e.g., within the same wireless local area network). For example, the endpoint device "C" can dynamically generate a visually-displayable or machine-readable identifier for retrieval of the "C" signet by a camera of the endpoint device "B". In one example, the visually-displayable identifier can be sent as a text string within an email sent to the endpoint device "B", enabling either manual user input of the text string into the endpoint device "B", or detection of the text string in the email by the endpoint device "B".

In another example, the network operating system 56 of the endpoint device "B" can obtain the "C" signet of the endpoint device "C" 12, based on the network operating system 56 of the endpoint device "C" 12 dynamically generating the visually-displayable or machine-readable identifier as one or more of a text string, a bar code, and/or a QR code. In one example the visually-displayable identifier generated by the endpoint device "C" 12 can specify the federation ID "F3" 18 of the associated federation "F3" 34 to which the endpoint device "C" 12 belongs, the endpoint ID of the endpoint device "C", and/or a hash of the email used during registration of the endpoint device "C" 12; hence, the visually-displayable or machine-readable identifier enables the endpoint device "B" to send a projection search to the MCP, enabling the MCP device to return to the endpoint device "B" the "C" signet based on the identifier specified in the visually-displayable or machine-readable identifier. The visually-displayable or machine-readable identifier also can specify the "C" signet, enabling endpoint device "B" to initiate the salutation protocol, via a local peer-to-peer connection, in response to reception of the "C" signet.

Hence, the reception of a signet enables establishment of a two-way trusted relationship with a second network device based on executing the prescribed secure salutation protocol with the second network device ("target network device") based on the public key specified in the signet. The device identifier specified in the signet enables reachability to the second network device ("target network device"). In one example, the device identifier can be an endpoint ID, where reachability to the endpoint ID can be resolved by a replicator device 16; in another example, the device identifier can be a local and/or global IPv4/IPv6 address, for example for reachability via a local peer-to-peer data link, a local private WiFi data network distinct from the private core network 10, etc.

A received signet can be stored and arranged for display (e.g., as a QR code) on a "contact page" for a given federation entity 34, where the "contact" page can include user name, email address used for registration, phone number, etc. Hence, the signet can be displayed on the contact page for a given federation entity 34 within a contact list, enabling a user to display the signet for another user that wishes to initiate a salutation request with the federation entity 34 identified on the "contact" page.

Additional details regarding the secure communications in the secure data network 5 are described in commonly-assigned, copending application Ser. No. 17/345,057, filed Jun. 11, 2021, entitled "CRYPTO-SIGNED SWITCHING BETWEEN TWO-WAY TRUSTED NETWORK DEVICES IN A SECURE PEER-TO-PEER DATA NETWORK", the disclosure of which is incorporated in its entirety herein by reference.

The example embodiments also enable establishment of two-way trusted relationships by an endpoint device (e.g., "A") 12 with one or more Internet of Things (IoT) devices, for example a wireless keyboard device. The endpoint device "A" 12 can establish a two-way trusted relationship with an IoT-based keyboard, within the secure data network 5, based on the endpoint device "A" 12 receiving a corresponding device identity container specifying a secure public key and a device identifier for the second network device (e.g., the IoT-based keyboard).

Additional details regarding use of signets to establish two-way trusted relationships between network devices is described in commonly-assigned, copending application Ser. No. 17/477,208, filed Sep. 16, 2021, entitled "ESTABLISHING AND MAINTAINING TRUSTED RELATIONSHIP BETWEEN SECURE NETWORK DEVICES IN SECURE PEER-TO-PEER DATA NETWORK BASED ON OBTAINING SECURE DEVICE IDENTITY CONTAINERS", the disclosure of which is incorporated in its entirety herein by reference.

Secure Peer-to-Peer Streaming Media Session Based on Updating Hypercontent

Figure 7:
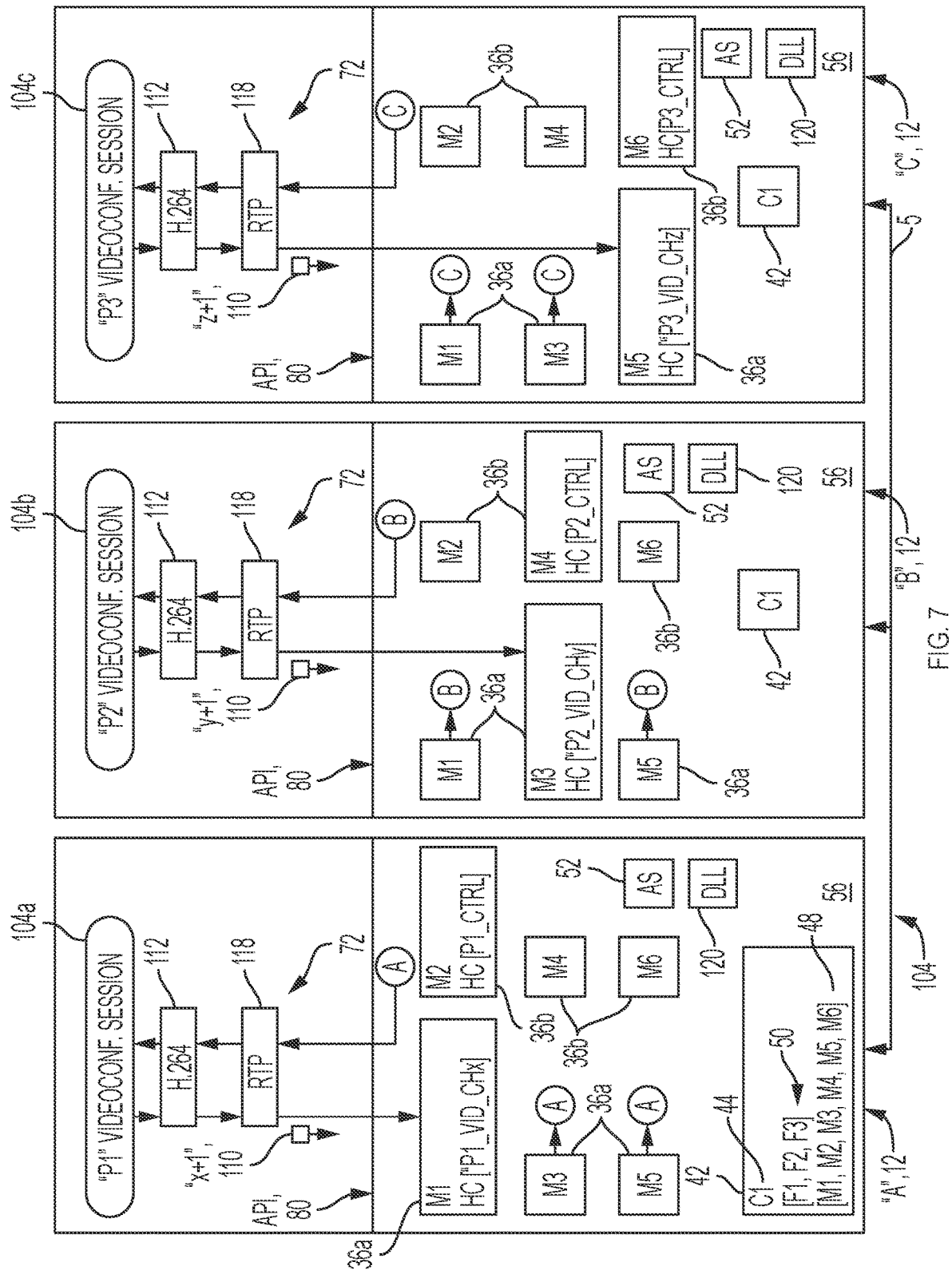
FIG. 7 illustrates an example secure peer-to-peer streaming media session by an originating entity with a second network entity and a third network entity in a secure peer-to-peer data network based on generating a first data object for the session that identifies message objects updated with streaming media data from the respective session participants, according to an example embodiment.

FIG. 7 illustrates an example secure peer-to-peer streaming media session 104 between an endpoint device "A" 12 of an originating entity (e.g., "P1"), a second network entity "P2" and a third network entity "P3" in a secure peer-to-peer data network 5, according to an example embodiment. The network operating system 56 executed in the endpoint device "A" 12 of the originating entity "P1" can initiate the secure peer-to-peer streaming media session 104 based on generating a first data object (e.g., a conversation object "C1") 42 for the session 104 that identifies one or more "data plane" message objects (e.g., "M1", "M3", and "M5") 36*a* updated with streaming media data from a streaming media source 72.

Each messenger application 72 can include a prescribed coder/decoder ("codec") (e.g., H.264) 112 for coding/decoding video and/or audio data, and a Real-Time Transport Protocol (RTP) packetizer module 118 for encapsulating/decapsulating the H.264 data into a stream of streaming media data chunks 110 having an example data rate of 64 kilobits per second (kbps) (for voice), 128 kbps to six-hundred 600 kbps for audio, or two (2) megabits per second (Mbps) or more for video streaming.

The network operating system 56 executed in each endpoint device 12 can provide prescribed commands via the APIs 80 that enable an executable media source/player, implemented for example in a secure messaging application 72 (e.g., the commercially-available "Society" application modified as described herein), to send a request for initiating the secure peer-to-peer streaming media session 104 with at least a second network entity "P2" in the secure data network 5, an optional third network entity "P3", etc.

The request for initiating the secure peer-to-peer streaming media session 104 generated and output by the secure messaging application 72 of the endpoint device "A" 12 can cause the network operating system 56 of the endpoint device "A" 12 to generate the conversation object "C1" 42 containing the subscriber list 50 of session participants "P1, P2" or "P3" as federation entities "F1", "F2" and "F3" 34. The network operating system 56 also can insert into the conversation object "C1" 42 a message reference 48 of zero or more message objects 36 associated with the secure peer-to-peer streaming media session 104, including a "data plane" message (e.g., "M1", "M3" and/or "M5") 36*a* of FIG. 8A, and a "control plane" message (e.g., "M2", "M4", and "M6") 36*b* of FIG. 8B, described below. As described previously, each update of the conversation object "C1" 42 can cause the endpoint device "A" 12 to autonomically synchronize, via the secure data network 5, the conversation object "C1" 42 (e.g., using the autonomic synchronizer 52) among the participants identified in the subscriber list 50.

The network operating system 56 executed in each endpoint device 12 also can provide prescribed commands via the APIs 80 that enable the messenger application 72 to send streaming media data, for example in the form of a sequence of streaming media data "chunks" (e.g., "P1_VID_CHx") 110, to the network operating system 56 for insertion by the network operating system 56 into a hypercontent field of a "data plane" message object 36*a*. As illustrated in FIG. 7, during the secure peer-to-peer streaming media session 104 the network operating system 56 of each endpoint device "A", "B", and "C" can insert a corresponding streaming media data chunk "P1_VID_CHx", "P2_VID_CHy", and "P3_VID_CHz" 110 into a hypercontent field (122*a* of FIG. 8A) of a corresponding data plane message object "M1", "M3", and "M5" 36*a*.

Moreover, each update of a first class data object (e.g., the conversation object "C1" 42 and each message object 36 in the message reference 48) by the network operating system 56 can cause the first class data object to be autonomically synchronized among the endpoint devices "A", "B", and "C" 12 participating in the secure peer-to-peer streaming media session 104 defined by the conversation object 42. In one example, a distributed lazy loader (DLL) 120 executed in the network operating system 56 of each of the endpoint devices "A", "B", and "C" 12 can respond to a detected update of any one of the message objects 36, for example based on each "destination" endpoint device 12 detecting the relative "last changed" timestamp value of message objects 36 received from cohort endpoint devices 12, by fetching from an available cohort device 12 the updated message object 36 having the most recent "last change" timestamp value in order to resolve the differential hypercontent state.

Hence, the example embodiments enable the distributed lazy loader 120 in each of the endpoint devices "A", "B", and "C" participating in the secure peer-to-peer streaming media session 104 to fetch each of the updated message objects 36 in response to each detected update, including the updated data plane message objects "M1", "M3", and/or "M5" 36*a* for retrieval of the respective streaming media data chunks 110 and delivery to the associated messenger applications 72. Moreover, the example embodiments enable each updated message object 36 to be retrieved via the secure data network 5 at a rate that exceeds existing data rates that are typically required for the streaming media data chunks 110 to provide a high-quality video presentation by a media player 72.

Figure 8A:
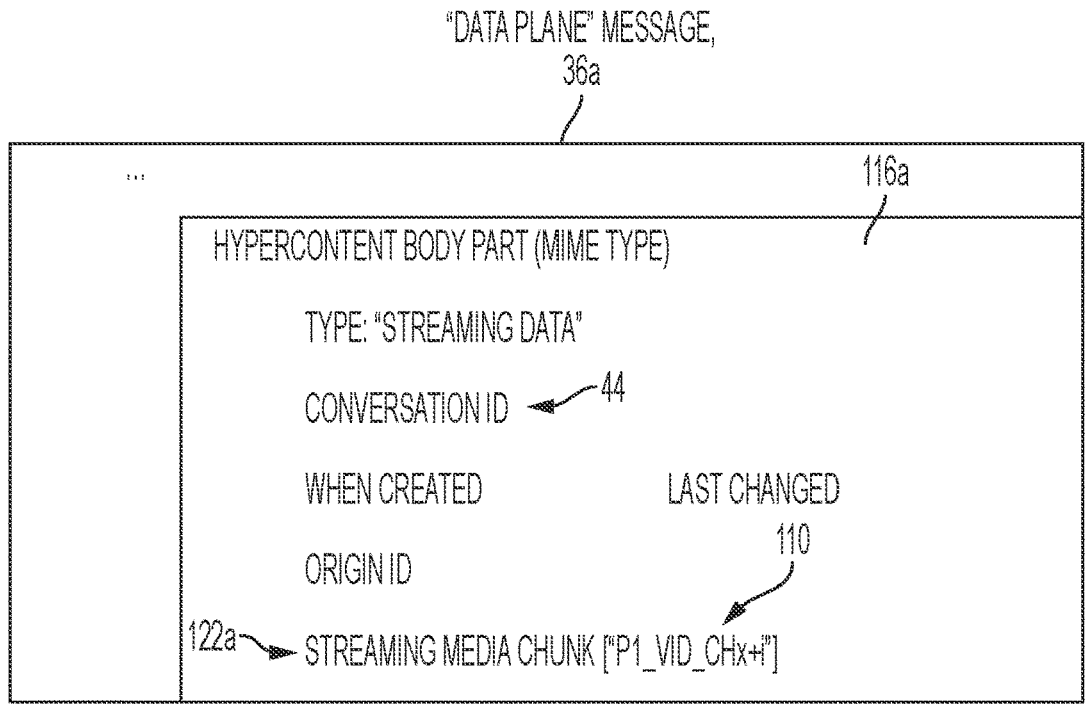
FIGS. 8A and 8B illustrate in further detail a message object containing a hypercontent field comprising a streaming media data chunk received from an executable media source executed in an endpoint device, and a message object containing a hypercontent field comprising call control data causing autonomic retrieval of each update of the streaming media data chunk by other session participants, according to an example embodiment.

FIG. 8A illustrates a data plane message object (e.g., "M1", "M3", or "M5") 36*a* containing a hypercontent body part 116*a* that contains a hypercontent field 122*a* comprising a streaming media data chunk (e.g., "P1_VID_CHx+i") 110 received from an executable media source 72 executed in an endpoint device "A" 12, according to an example embodiment. The data plane message object 36 of FIG. 8A, in addition to containing the data structures and data fields illustrated in FIG. 2, also contains metadata describing the data plane message object 36*a* that contains the streaming media data chunk (e.g., "P1_VID_CHx+i") 110, including a hypercontent type field "STREAMING DATA" indicating the hypercontent field 122*a* contains a streaming media data chunk 110. As described previously, each message object 36*a* and 36*b* also includes a conversation identifier 44, a creation timestamp "WHEN CREATED" for the message object 36, a last changed timestamp "LAST CHANGED" for the message object, an origin ID identifying the endpoint ID of the endpoint device 12 that generated or modified the message object 36.

Figure 8B:
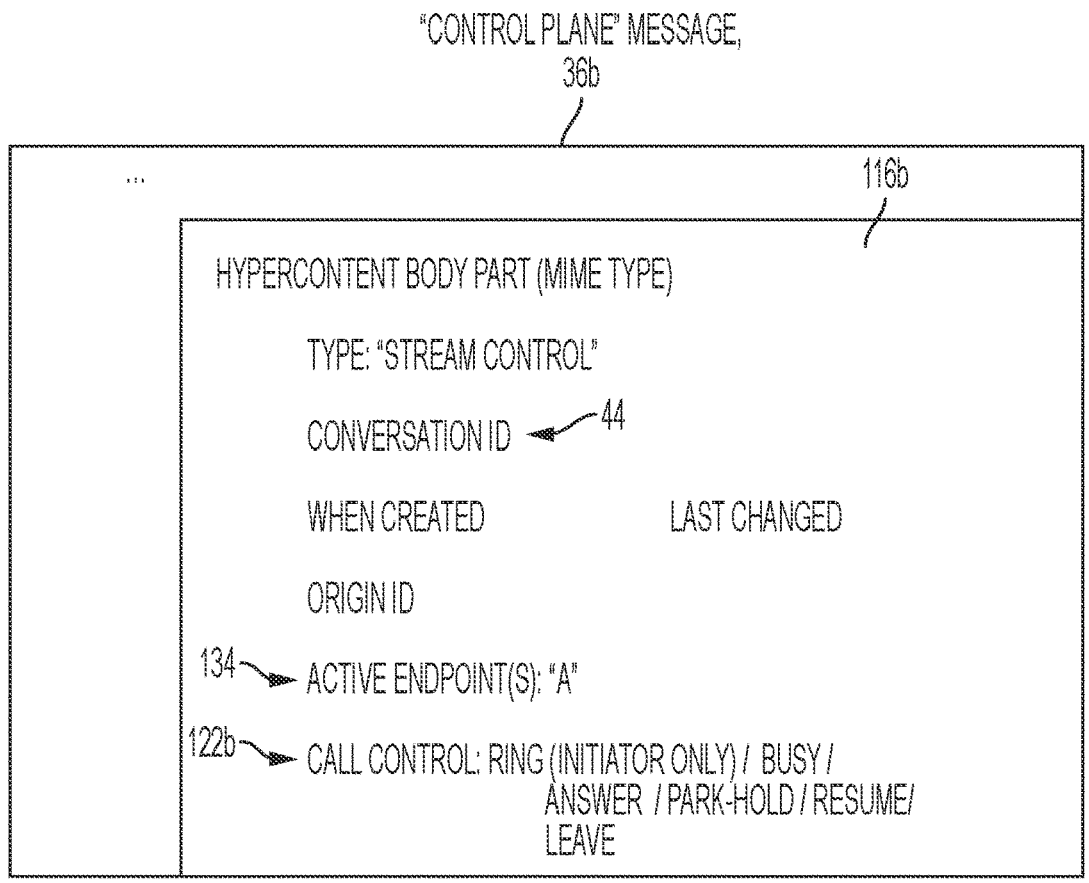

FIG. 8B illustrates a "control plane" message object 36*b* comprising a hypercontent body part 116*b* that contains a hypercontent type field "STREAM CONTROL" indicating that the hypercontent field 122*b* contains call control metadata describing a corresponding status for the corresponding data plane message 36a. For example, the message object 36b can specify a call control status within a hypercontent field 122b, for example "RING", "BUSY", "ANSWER", "PARK-HOLD", "RESUME", and/or "LEAVE", described below. The message object 36b also can specify an active endpoint field 134 that identifies an endpoint ID (e.g., "A") 20 of one or more endpoint devices 12 of a federation that are actively participating in the secure peer-to-peer streaming media session 104.

As described below, the control plane message object 36b enables each endpoint device 12 participating in the secure peer-to-peer streaming media session 104 to determine the status of every other participant device 12, for example: whether an originating endpoint device "A" 12 has requested another endpoint device 12 to join the secure peer-to-peer streaming media session 104 based on issuing a "RING" notification; whether a target endpoint device 12 for an invited federation in the subscriber list 50 is "busy" and cannot currently participate in the secure peer-to-peer streaming media session 104; whether a participant endpoint device 12 has responded to a "RING" notification by joining the secure peer-to-peer streaming media session 104 via an "ANSWER" status; whether a participant device 12 has entered a "PARK-HOLD" state (e.g., to take another call, to switch to another endpoint device in the same federation, etc.); whether a participant device 12 has restarted streaming in the secure peer-to-peer streaming media session 104 based on a "RESUME" status; or whether a participant device 12 is leaving the secure peer-to-peer streaming media session 104 based on a "LEAVE" status.

As described previously, each change in any first-class data object is autonomically replicated among the endpoint devices 12 among the participating federations "F1", "F2", and "F3" identified in the subscriber list 50; hence, each participant network device 12 in the secure peer-to-peer streaming media session 104 can instantly determine the status of every other participant network device via the control plane message 36b, and can retrieve the most recent streaming media data chunk 110 from the data plane message 36a for delivery to the local messenger application 72.

Figure 9A:
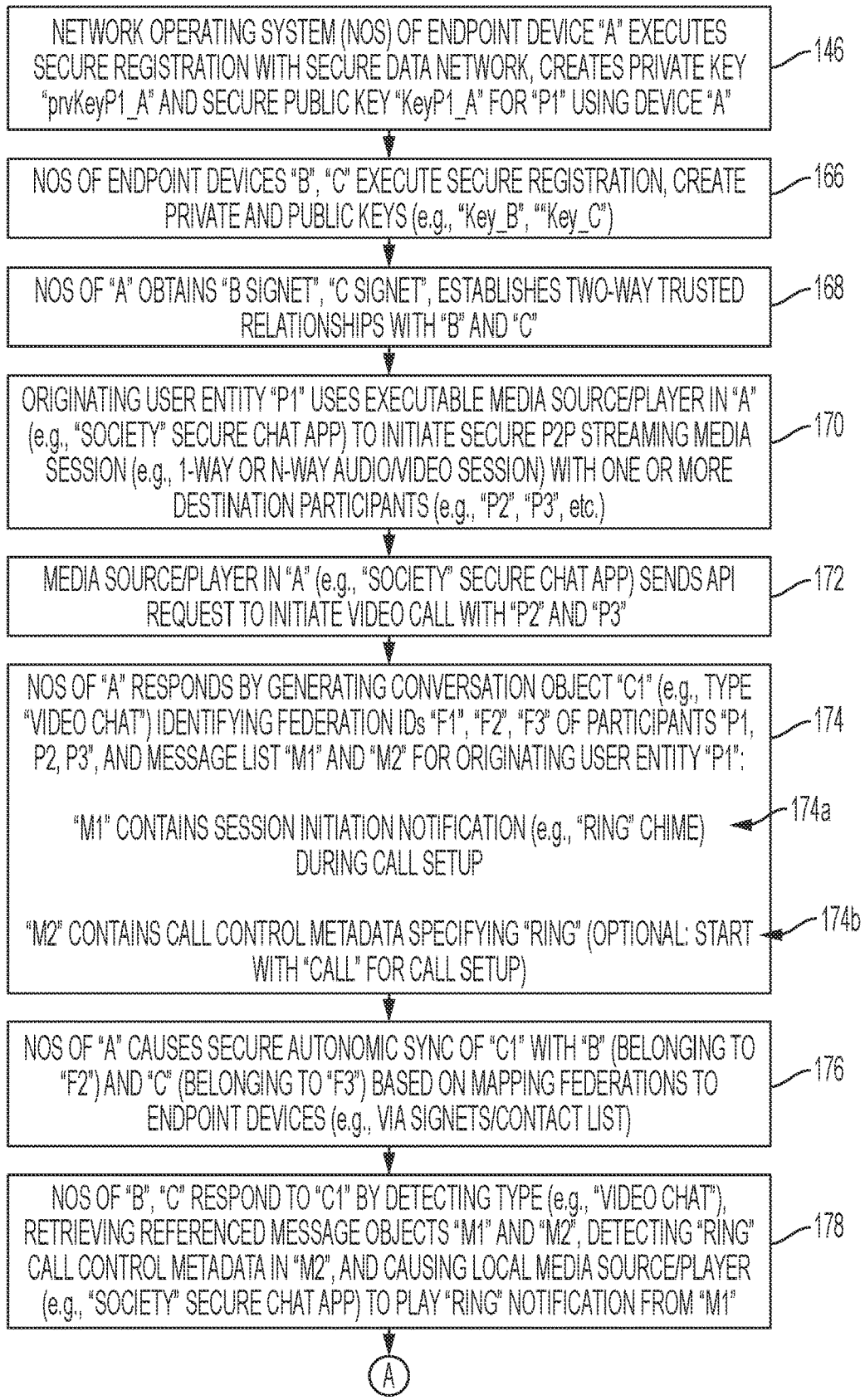
FIGS. 9A-9C illustrate an example method of executing a secure peer-to-peer streaming media session among session participants, based on updating one or more message objects with streaming media data that causes autonomic retrieval of each update of the message object by other session participants, according to an example embodiment.
Figure 9B:
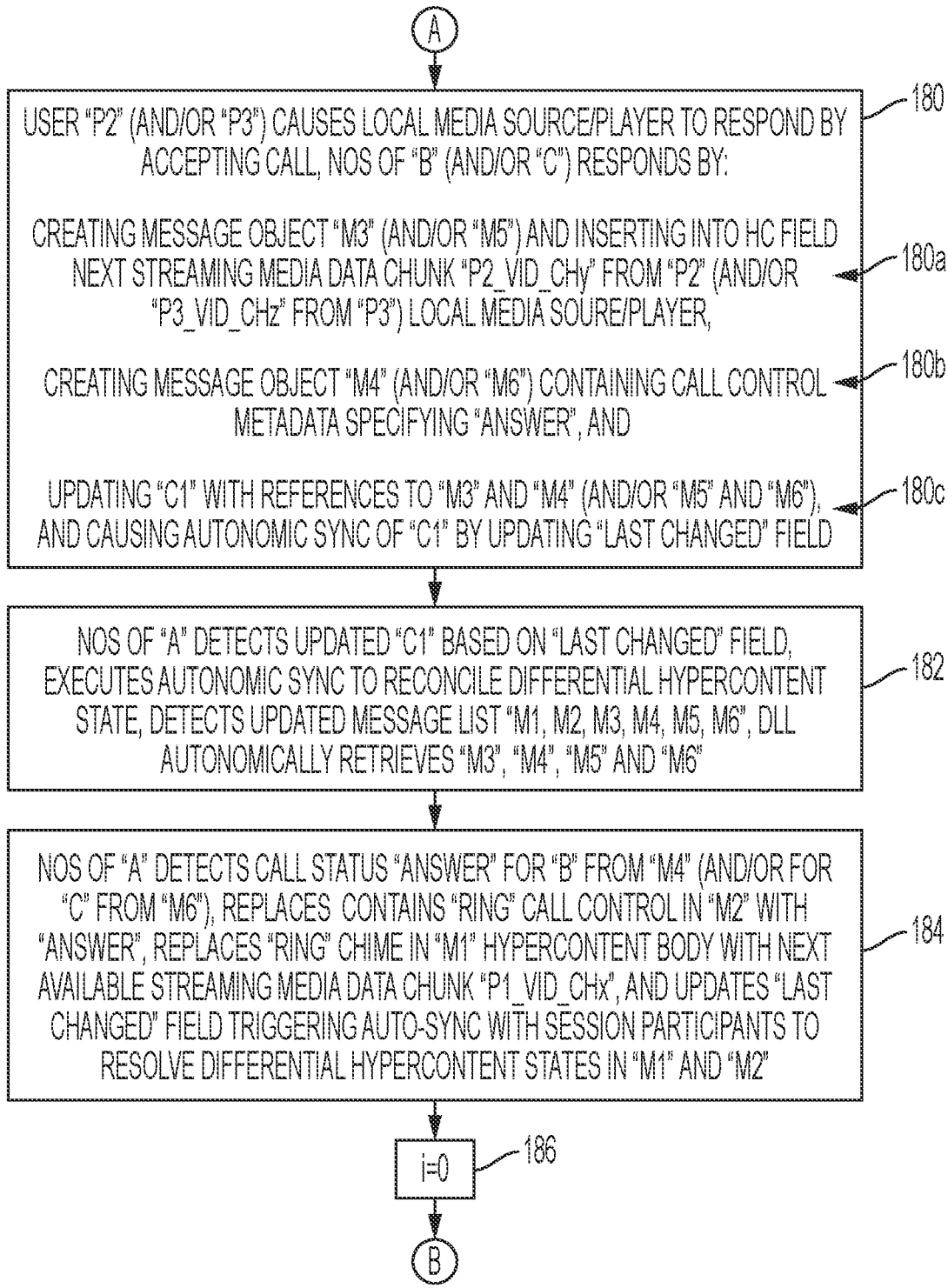
Figure 9C:
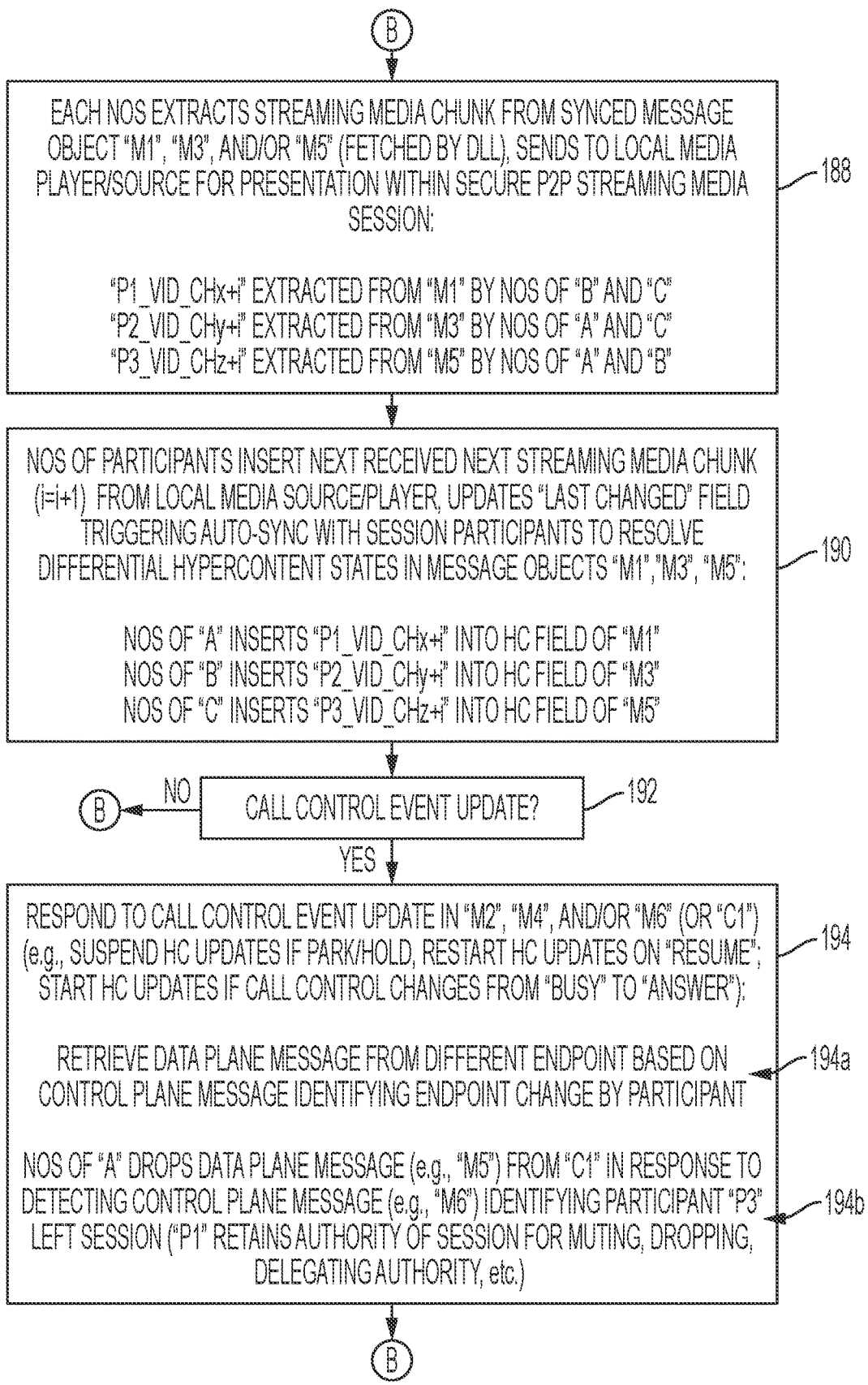

Hence, the example embodiments enable a real-time or near real-time secure peer-to-peer streaming media session 104 between multiple participants, where each streaming media data chunk 110 of a media stream at a "source" participant device (e.g., "A") 12 is replicated to other participant devices (e.g., "B", "C") based on updating (i.e., overwriting) the existing streaming media data chunk (e.g., "P1_VID_CHx") stored in the hypercontent body part 116 of a message object (e.g., "M1") 36 with the next streaming data chunk (e.g., "P1_VID_CHx+1") in the sequence of "x, x+1, x+2, etc." that is output by the RTP packetizer module 118 of the messenger application 72: the updated data plane message object 36a is detected by the other participant devices 12, causing the other participant devices 12 to retrieve the updated data plane message object 36a. As described below, call control information within one or more of the control plane messages "M2", "M4", or "M6" can pause or resume updating of a hypercontent body part 116 based on a determined call status (e.g., "busy", "park-hold", "answer", "resume", "leave", etc.). FIGS. 9A-9C illustrate an example method of executing a secure peer-to-peer streaming media session 104 among session participants "P1", "P2", and "P3", based on updating one or more data plane message objects 36a with streaming media data 110 that causes autonomic retrieval of each update of the message object 36a by other session participants, according to an example embodiment.

Referring to FIG. 9A, a user "P1" can install the network operating system 56 and optionally a security-enabled consumer application (e.g., the messenger app "Society" 72) in the endpoint device "A" 12 in operation 146, enabling the user "P1" to register in operation 146 the user device as an endpoint device "A" 12 as described previously with respect to FIGS. 1-6. As described previously, the guardian security agent 66 (illustrated in FIG. 1 as within the AI-based security suite 64) executed in the endpoint device "A" 12 can generate in operation 146 its own private key "prvKeyP1_A" and a corresponding public key "KeyP1_A". As described previously with respect to FIG. 5, the network operating system 56 of the endpoint device "A" 12 in operation 146 can generate its own federation ID "F1" 18, and its own endpoint ID (e.g., "EID_A") 20, and generate and supply to the MCP device 14 a registration message (126a of FIG. 5). As described previously, the MCP device 14 in operation can complete the registration of the endpoint device "A" 12 based on generating and sending a secure registration acknowledgment 136 that contains the MCP signet and the "A" signet.

As described previously, the network operating systems 56 of the endpoint devices "B" and "C" 12 in operation 166 also can execute registration with the MCP device 14, including the respective network operating systems 56 generating their own private keys public keys "Key_B" and "Key_C".

As described previously, the network operating system 56 of the endpoint device "A" 12 in operation 168 can obtain the "B" signet of the endpoint device "B" 12 (e.g., via an available QR code, text string received by the endpoint device "A" 12, etc.), and the corresponding "C" signet of the endpoint device "C" 12, causing the network operating system 56 of the endpoint device "A" 12 to establish a two-way trusted relationship with each of the endpoint devices "B" and "C". As described previously, the endpoint device "A" 12 also can optionally establish a two-way trusted relationship with the replicator device "R1" 16 for secure communications with the community server 30 via the secure core network 10. Hence, the endpoint device "A" 12 can execute secure communications with the endpoint devices "B" and/or "C" via a secure P2P data connection (e.g., via a secure P2P data link or via a secure P2P connection via the external data network 96), and/or a hybrid P2P connection via the replicator device "R1" 16. Hence, the originating endpoint device "A" 12 can establish the secure peer-to-peer streaming media session 104 with the other participant devices "B" and/or "C" 12 via secure P2P connections, without any access of the secure core data network 10 of FIG. 2, 5, or 6.

The originating user entity "P1" (having federation ID "F1") can cause in operation 170 an executable application (e.g., a messaging application providing "secure chat" (e.g., Society) 72, an audio/video conference application, etc.) 58 executed in the physical network device 88a executing the endpoint device "A" 12 to initiate a secure peer-to-peer (P2P) streaming media session 104 with one or more other "destination" participants (e.g., "P2", "P3") having respective federation IDs (e.g., "F2", "F3"). The secure peer-to-peer streaming media session 104 can be implemented as a one-way multicast audio/video presentation, for example a "live" presentation such as a subscription-only audio/video music performance, a video-based multicast presentation to authorized participants, etc.; the secure peer-to-peer streaming media session 104 also can be implemented as an "N-way" audio/video session between "N" participants, for example in the form of a video-based "chat" or a video-based virtual meeting or conference.

The originating user entity "P1" can cause the executable application (e.g., a media source/player within the "Society" secure chat app 72) 58 to access in operation 172 a prescribed API 80 of the network operating system 56, causing the network operating system 56 of the originating endpoint device "A" 12 in operation 172 to receive a request to initiate the secure peer-to-peer streaming media session 104 with at least a second network entity "P2" (and optionally a third network entity "P3") as invited participants of the secure peer-to-peer streaming media session 104.

The network operating system 56 of the originating endpoint device "A" 12 in operation 174 can respond to the request from the messenger application 72 (via the API 80) by generating the conversation object "C1" 42, illustrated in FIG. 7. In addition to the data structures illustrated in FIGS. 2 and 7 (including the conversation identifier "C1" 44, the subscriber list 50, the message list 48, the lifecycle policy "L" 24, and the distribution policy "D" 26), the network operating system 56 also can insert into the conversation object "C1" 42 a metadata field identifying the conversation type as "VIDEO CHAT" (or "AUDIO CHAT", etc.). Hence, the network operating system 56 can insert into the conversation object "C1" the subscriber list 50 identifying the session participants by federation identifiers "F1", "F2", and "F3", and a message list 48 for at least the data plane message "M1" 36a and the control plane message "M2" 36b generated by the network operating system 56 in the endpoint device 12 for the originating user entity "P1" (federation ID "F1").

As illustrated in FIG. 9A, the network operating system 56 of the originating endpoint device "A" 12 in operation 174a generates the data plane message "M1" 36 that can include, within the hypercontent field 122a, a small audio file that serves as a session initiation notification (e.g., a one to two-second repeating "ring" chime) for the destination participants "P2" and "P3" during call setup. The network operating system 56 of the originating endpoint device "A" 12 in operation 174b can generate the control plane message "M2" 36b that can include, within the hypercontent field 122b, call control metadata identifying a ring call control "RING" describing the current call control state of the secure peer-to-peer streaming media session 104, namely that the endpoint device "A" 12 is initiating the secure peer-to-peer streaming media session 104 as a call setup state based on generating "ring" tones/"ring" chimes.

Hence, the generation of the conversation object "C1" 42 by the network operating system 56 of the endpoint device "A" 12 in operation 174 causes the network operating system 56 to execute in operation 176 a secure autonomic synchronization of the conversation object "C1" 42 with the endpoint device "B" 12 (identified by the network operating system 56 of the endpoint device "A" 12 as belonging to the federation "F2" in the subscriber list 50 based on a corresponding contact page entry associating the federation ID 18 to one or more signets), and with the endpoint device "C" 12 (identified by the network operating system 56 of the endpoint device "A" 12 as belonging to the federation "F3" in the subscriber list 50 based on a corresponding contact page entry). As described previously, the network operating system 56 of the endpoint device "A" 12 in operation 176 can execute the secure autonomic synchronization of the "in-flight" conversation object "C1" 42, via the secure data network 5, based on generating secure data packets using respective temporal keys that are encrypted by the respective public keys "Key_B" and "Key_C" (obtained from the signets of the endpoint devices "B" and "C", respectively), and signing the secure data packets with the private key "prvKeyP1_A".

The network operating system 56 of the endpoint device "B" 12 and/or the endpoint device "C" 12 in operation 178 can respond to the autonomic synchronization of the conversation object "C1" 42 generated by the endpoint device "A" 12 by detecting the conversation type, for example "VIDEO CHAT", and in response retrieve the referenced message objects "M1" 36a and "M2" 36b via secure packets that are encrypted as described previously. The network operating system 56 of the endpoint device "B" 12 and/or C in operation 178 can determine from the hypercontent field 122b in the control plane message "M2" the ring call control "P1_CTRL=RING" indicating a request for a call setup, and in response retrieve the session initiation notification (e.g., "ring" chime) from the data plane message "M1" 36a for presentation by the messenger application 72 as an alert to the user "P2" and/or "P3" of a new video call/video chat initiated by the originating entity "P1".

Referring to FIG. 9B, a user "P2" (and/or "P3") in operation 180 can cause its corresponding local media source/player (e.g., in the messenger application 72) to respond to the conversation object "C1" 42 by accepting the "incoming" video call/chat via the APIs 80. The network operating system 56 executed in the endpoint device "B" 12 in operation 180a can create a data plane message object "M3" 36a that can contain a hypercontent field 122a containing the next streaming media chunk (e.g., "P2_VID_CHy") 110 output by the RTP packetizer module 118 of the messenger application 72. The network operating system 56 executed in the endpoint device "B" 12 in operation 180b also can create a control plane message "M4" 36b specifying in its active endpoint field 134 the endpoint identifier "B" 20, and further specifying in its hypercontent field 122b a call control "P2_CTRL=ANSWER" indicating that the federation entity "F2" is answering the video call/chat via the endpoint device "B" 12. The network operating system 56 of the endpoint device "B" 12 in operation 180c also can update the message reference 48 of the conversation object "C1" 42 with the message IDs "M3" and "M4" 38, and can further update the "last changed" timestamp value based on updating the message reference 48.

Similarly, the user "P3" in operation 180 can cause its messenger application 72 to accept the incoming video call/chat via the APIs 80, causing the network operating system 56 of the endpoint device "C" 12 in operation 80 to create a data plane message object "M5" 36a that can contain a hypercontent field 122a containing the next streaming media chunk (e.g., "P3_VID_CHz") 110 output by the RTP packetizer module 118 of the messenger application 72. The network operating system 56 executed in the endpoint device "C" 12 in operation 180b also can create a control plane message "M6" 36b specifying in its active endpoint field 134 the endpoint identifier "C" 20, and further specifying in its hypercontent field 122b a call control "P3 CTRL=ANSWER" indicating that the federation entity "F3" is answering the video call/chat via the endpoint device "C" 12. The network operating system 56 of the endpoint device "C" 12 in operation 180c also can update the message reference 48 of the conversation object "C1" 42 with the message IDs "M5" and "M6" 38, and can further update the "last changed" timestamp value based on updating the message reference 48.

As described previously, each update of the conversation object "C1" 42 causes autonomic synchronization of the conversation object "C1" 42 among the federations identified in the subscriber list 50. Hence, the network operating system 56 of each of endpoint devices 12 in each of the federations "F1", "F2", and "F3" 34 specified in the subscriber list 50 of the conversation object "C1" in operation 182 can synchronize to the most recent version of the conversation object "C1" 42, based on the "last changed" timestamp value, to reconcile any differential hypercontent state, resulting in updating the message reference 48 to specify each of the message objects "M1" through "M6" as illustrated in FIG. 7. Hence, the network operating system 56 of the originating endpoint device "A" 12 in operation 182 can detect the updated message list 48, and in response the distributed lazy loader 120 executed in the endpoint device "A" 12 can autonomically retrieve the message objects "M3" 36a and "M4" 36b created by the endpoint device "B" 12, and the message objects "M5" 36a and "M6" 36b created by the endpoint device "C" 12.

The network operating system 56 executed in each endpoint device 12 in use by a session participant (e.g., the endpoint device "A" 12, the endpoint device "B" 12, and the endpoint device "C" 12) in operation 184 can detect the call status "ANSWER" specified in the hypercontent field 122b of the control plane messages "M4" and "M6". Hence, the network operating system 56 of the originating endpoint device "A" 12 in operation 184 can respond to the updated call status "ANSWER" in the control plane messages "M4" and "M6" by replacing, in the hypercontent field 122b of the control plane message "M1" 36b, the "RING" value in the ring call control "P1_CTRL=RING" of the hypercontent field 122b with an updated call status "P1_CTRL=ANSWER", and updating the "last changed" timestamp. The network operating system 56 executed in the originating endpoint device "A" 12 in operation 184 also can replace the "ring" chime in the hypercontent field 122a of the data plane message "M1" 36a with each streaming media chunk (e.g., "P1_VID_CHx") 110 as it is received from the corresponding RTP packetizer module 118, and update the "last changed" timestamp.

As described previously, the distributed lazy loader (DLL) 120 executed in the network operating system 56 of each of the endpoint devices "A", "B", and "C" 12 can detect an update in the "last changed" timestamp value in any one of the message objects 36 "M1" through "M6" identified in the message reference 48 of the conversation object "C1" 42 for the secure peer-to-peer streaming media session 104. In particular, each distributed lazy loader 120 can monitor for updates in the conversation object "C1" 42 (and/or the message objects "M1" through "M6" 36) based on repeated execution of projection searches that are limited to the federation entities identified in the subscriber list 50.

Each distributed lazy loader 120 can determine a rate for repeating the projection searches based on detecting the metadata type "video chat" specified in the conversation object "C1", the metadata type "streaming data" in each data plane message "M1", "M3", and "M5" 36a, as well as the metadata type "stream control" in each control plane message "M2", "M4", and "M6" 36b. Hence, each distributed lazy loader 120 can determine a rate for repeating the projection searches on each data plane message "M1", "M3", and "M5" 36a as exceeding a maximum streaming rate (e.g., greater than 2 Mbps or 6 Mbps if needed) based on the "streaming data" message type, enabling each distributed lazy loader 120 to output a secure query to determine the "last changed" timestamp for an available message object 36a. Each distributed lazy loader 120 also can monitor the rate at which the "last changed" timestamp is updated for each message object 36, enabling the distributed lazy loader 120 to heuristically "tune" its projection search repeat rate to substantially match the determined update rate by the corresponding originating endpoint device 12 owning the message object 36.

Consequently, the distributed lazy loader 120 executed in each endpoint device "A", "B", and/or "C" is configured for fetching an updated message object 36 identified in the conversation object "C1" for the secure peer-to-peer streaming media session 104, as opposed to conventional implementations that assume a "source device" must expend resources to "broadcast" or "multicast" data streams throughout a data network. Hence, each distributed lazy loader 120 can execute localized optimization decisions to identify a "best source" for opportunistically retrieving a given data object, for example based on executing a whisper protocol that attempts to locate the best "source" for the data objects. Hence, in one example, the distributed lazy loader 120 executed in the endpoint device "C" 12 can decide that retrieval of the message objects "M1" through "M4" from the endpoint device "B" 12 (e.g., via a locally-available P2P data link) is preferable to attempting retrieval from the endpoint device "A" 12 (that may be at a remote location), particularly if the endpoint device "B" 12 has already established a secure P2P connection with the endpoint device "A" 12 via an external data network 96 (and that may or may not include a hybrid P2P connection via a replicator device 16).

Hence, as illustrated in FIG. 9C, each network operating system 56 of an endpoint device "A", "B", and/or "C" participating in the secure peer-to-peer streaming media session 104 in operation 188 can extract a streaming media data chunk 110 from a synchronized message object 36 (retrieved by the corresponding distributed lazy loader 120 in response to a detected update in the "last changed" timestamp), for presentation to the corresponding messenger application 72 as part of the local secure peer-to-peer streaming media session 104.

For example, the network operating system 56 of the endpoint devices "B" and "C" 12 in operation 188 can extract the initial streaming media data chunk "P1_VID_CHx" ("i" is initially set to zero in operation 186 of FIG. 9B for purposes of illustrating an initial streaming media chunk 100) from the hypercontent field 122a of the data plane message "M1" 36a, for delivery to the media players 72 and presentation in the respective local sessions 104b and 104c.

The network operating system 56 of the endpoint devices "A" and "C" 12 in operation 188 can extract the initial streaming media data chunk "P2_VID_CHy" ("i" is initially set to zero in operation 186) from the hypercontent field 122a of the data plane message "M3" 36a, for delivery to the media players 72 and presentation in the respective local sessions 104a and 104c.

The network operating system 56 of the endpoint devices "A" and "B" 12 in operation 188 can extract the initial streaming media data chunk "P3_VID_CHz" ("i" is initially set to zero in operation 186) from the hypercontent field 122a of the data plane message "M5" 36a, for delivery to the media players 72 and presentation in the respective local sessions 104a and 104b. Each network operating system 56 in an endpoint device also can respond in operation 190 to receiving the next "i+1" successive streaming media data chunk 110 from the RTP packetizer module 118 of a corresponding local media source/player 71 by updating (i.e., overwriting) the hypercontent field 122a of the corresponding data plane message 36a with the next streaming media data chunk 110, and updating the corresponding "last changed" field, independent from the extraction of the streaming chunks 110 from retrieved data plane message objects 36a in operation 188.

Hence, the network operating system 56 of the endpoint device "A" 12 in operation 190 can insert the next streaming media data chunk "P1_VID_CHx+i" into the hypercontent field 122 of the data plane message "M1" 36a; the network operating system 56 of the endpoint device "B" 12 in operation 190 can insert the next streaming media data chunk "P2_VID_CHy+i" into the hypercontent field 122 of the data plane message "M3" 36a; and the network operating system 56 of the endpoint device "C" 12 in operation 190 can insert the next streaming media data chunk "P3_VID_CHz+i" into the hypercontent field 122 of the data plane message "M3" 36a.

Assuming no detected update of any call control event in the conversation object "C1" 42 or any of the control plane messages "M2", "M4", or "M6" 36b in operation 192, the network operating system 56 executed in each of the participating endpoint devices "A", "B", and "C" 12 can repeat operations 188 and 190, including detecting updates in the data plane messages 36a, fetching the updated data plane messages 36a, and extracting the streaming media chunks 110 for delivery and presentation in the respective local sessions 104a, 104b, and 104c. Hence, the example embodiments enable implementation of a secure peer-to-peer streaming media session 104 enables each of the messenger applications 72 to present a live or near-live video chat between each of the session participants "P1", P2", and "P3", without the need for any centralized meeting server.

As described previously, each distributed lazy loader 120 can maintain a projection search "refresh rate" at a sufficiently rate that can exceed any of the media stream data rates, ensuring that each streaming media data chunk 110 can be retrieved from an updated data plane message 36a at a sufficient rate that can prevent any appearance of any jitter or delay in a local presentation of any session (e.g., 104a). The retrieval by a distributed lazy loader 120 in an endpoint device 12 also ensures that any connectivity issues (e.g., poor data link connection by a given endpoint device 12) does not adversely affect any other of the endpoint devices 12, as the retrieval of updated messages 36 prevents any congestion in the secure data network 5, as opposed to conventional deployments that require a network infrastructure to provide a guaranteed quality of service (QoS) for large-scale streaming media events that rely on a centralized server.

The retrieval by a distributed lazy loader 120 of an updated data plane message 36a also eliminates any buffer overflow concerns that are normally encountered in centralized streaming media deployments, as any transient issue (e.g., poor network connectivity by a endpoint device 12) merely results in a "gap" in retrieving the sequence of streaming media data chunks 110, which depending on conditions can be almost imperceptible by the participants of the secure peer-to-peer streaming media session 104.

The retrieval of the message object 36s by the endpoint device 12 also enables concurrent call management based on the control plane messages "M2", "M4", and "M6" 36b. Hence, a user input can cause a messenger application 72 to change (via the APIs 80) a call status, causing the network operating system 56 of the associated endpoint device (e.g., "C") 12 to respond to the change in call control status by updating the hypercontent field 122b, and updating the "last changed" field in the message object 36b (e.g., in the control plane message "M6" 36b). In one example, the endpoint devices "A" and "B" 12 in operation 192 can detect, based on their distributed lazy loader 120 retrieving the updated control plane message "M6", that the participating federation "F3" (participant "P3") has changed from an "ANSWER" state to a "PARK-HOLD" state, causing the distributed lazy loader 120 in each of the endpoint devices "A" and "B" 12 in operation 194 to substantially reduce (or suspend) projection searches for hypercontent updates of the associated data plane message "M5" 36a.

As described previously, each conversation object 42 can be federated across all endpoint devices 12 within the same federation 34. Hence, assume that the federation "F3" 34 includes a second endpoint device "CA" 12 (not shown in FIGS. 1-8) that can receive the conversation object "C1" 42 via the federated endpoint device "C" 12 in operation 176: the second endpoint device "CA" 12 also can retrieve the message object "M1" 36a in operation 178, causing the concurrent "ringing" of the "ring" notification by endpoint devices "C" and "CA" in the federation "F3" during call setup; in this example, the selection of the endpoint device "C" 12 in operation 176 by the participant "P3" causes the endpoint device "C" to insert into the control plane message "M6" 36b that the active endpoint is "C". Consequently, the "idle" endpoint device "CA" 12 can synchronize updates to the conversation object "C1" 42 and the federated control plane message "M6" 36b, without the need for any retrieval of the messages "M1" through "M5".

Assume further that participant "P3" causes the network operating system 56 of the endpoint device "C" 12 to change the call control status in the hypercontent field 122 of the control plane message "M6" 36b to "PARK-HOLD", causing the network operating system 56 in the endpoint device "C" 12 to suspend updating the hypercontent field 122a of the data plane message object "M6" 36a. The updated control plane message "M6" 36b can cause the endpoint devices "A" and "B" to suspend hypercontent updates of the data plane message "M5" 36a during the secure peer-to-peer streaming media session 104. Since the idle endpoint device "CA" 12 has a stored copy of the updated conversation object "C1" 42 and the federated control plane message "M6" 36b, the participant "P3" can access the secure peer-to-peer streaming media session 104 via the messenger application 72 of the "CA" 12, causing the network operating system 56 executed in the endpoint device "CA" 12 to update the federated control plane message "M6" 36b by changing the active endpoint field 134 to specify the endpoint ID "CA" 20 and the hypercontent field 122b to specify the call control status "RESUME" (operation 180b of FIG. 9B). The network operating system 56 executed in the endpoint device "CA" 12 also can update the data plane message "M5" (retrieved from the federated endpoint "C" 12) with an updated origin identifier metadata value, and an updated hypercontent field 122a containing the next streaming media data chunk 110 (operation 180a).

Hence, the endpoint devices "A" and "B" 12 in operation 194a can detect the updated active endpoint "CA" from the active endpoint field 134 in the updated control plane message object "M6" 36b (following establishment of a two-way trusted relationship by the active endpoint "CA" 12 with each of the endpoint devices "A" and "B" 12, if needed), and in response retrieve the updated data plane message object "M5" 36a originated by the endpoint device "CA" 12, as opposed to the now-idle endpoint device "C" 12.

Similarly, the network operating system 56 executed in each of the endpoint devices "A" and "B" 12 in operation 194*b* can detect that the participant "P3" has ended the secure peer-to-peer streaming media session 104 in response to network operating system 56 executed in the active endpoint device "CA" (or "C") 12 updating the hypercontent field 122*b* of the control plane message "M6" 36*b* to the "LEAVE" call status. The network operating system 56 of the endpoint device "A" 12 in operation 194*b* can drop the data plane message "M5" from the message reference 48 of the conversation object "C1" 42 in response to detecting the "LEAVE" call status in the hypercontent field 122*b* of the control plane message "M6". As apparent from the foregoing, the originating federation "F1" of the participant "P1" retains authority to control the secure peer-to-peer streaming media session 104 based on the ownership attributes for the conversation object "C1" 42, including muting any session participant, dropping any session participant (including outcasting), sharing or delegating authority (or a portion thereof) to another session participant or reclaiming the authority, or ending the secure peer-to-peer streaming media session 104.

Additional details regarding generation of a "secure chat" are described in commonly-assigned, copending application Ser. No. 17/388,162, filed Jul. 29, 2021, entitled "SECURE PEER-TO-PEER BASED COMMUNICATION SESSIONS VIA NETWORK OPERATING SYSTEM IN SECURE DATA NETWORK", the disclosure of which is incorporated in its entirety herein by reference.

In addition to the above-identified secure peer-to-peer streaming media session 104 enabling live or near-live presentation of one or more media streams, additional message objects 36 can be added to the secure peer-to-peer streaming media session 104 based on referencing the message objects within the same conversation object "C1" 42 defining the secure peer-to-peer streaming media session 104 (or a different conversation object 42 that is presented concurrently by the messenger application 72 with the secure peer-to-peer streaming media session 104, if preferred), for example PDF documents, JPG image files, motion JPG files, video files, etc., that can be distributed securely as hyperlinked hypercontent. Additional details regarding secure distribution of hyperlinked hypercontent is described in commonly-assigned, copending application Ser. No. 17/532,740, filed Nov. 22, 2021, entitled "AUTONOMIC DISTRIBUTION OF HYPERLINKED HYPERCONTENT IN A SECURE PEER-TO-PEER DATA NETWORK", the disclosure of which is incorporated in its entirety herein by reference. As apparent from the foregoing, the example embodiments enable scalable interactive sessions comprising a secure peer-to-peer streaming media session combined with distributed hyperlinked hypercontent, based on the hardware capabilities of each endpoint device 12, where endpoint devices having larger memory, larger processor capacity, etc., can provide higher-quality interactive sessions. Hence, the example embodiments enable an interactive secure peer-to-peer streaming media session 104 that can combine multiple media streams by respective endpoint devices 12, in combination with the exchange of hyperlinked hypercontent.

According to example embodiments, secure streaming media sessions can be established between multiple session participants in a scalable manner via a secure peer-to-peer data network, based on a secure data network established based solely on secure peer-to-peer data connections, or based on a combination of secure peer-to-peer data connections and a secure peer-to-peer connection with one or more replicator devices for establishment of one or more hybrid peer-to-peer connections. The establishment of secure streaming media sessions via a secure peer-to-peer data network enables simultaneous presentation of multiple participants in a scalable manner, without the necessity of any server (e.g., a meeting server). Further, the secure peer-to-peer streaming sessions as described herein can be implemented on different computing devices utilizing different device operating systems, based on installation and execution of the network operating system (i.e., secure executable container) that retains sole and exclusive authority to establish and maintain the trusted two-way relationships between network devices, and between a network device and its authorized user.

The example embodiments also enable a relatively high level of "concurrency" between "cohort" endpoint devices having established a two-way trusted relationship, enabling nearly-instantaneous synchronization of updated data objects in order to provide a presentation of multiple high-quality media streams simultaneously by a messaging application, without concerns of buffering, jitter, or latency as normally encountered in existing data networks.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:

receiving, by a secure executable container executed by an endpoint device, a request by an originating entity for initiating a secure peer-to-peer streaming media session with at least a second network entity in a secure data network, the secure executable container having established a two-way trusted relationship between the originating entity and the endpoint device in the secure data network and a corresponding two-way trusted relationship between the endpoint device and a second network device of the second network entity;

generating, by the secure executable container in response to the request, a first data object identifying the second network entity as a participant in the secure peer-to-peer streaming media session, and causing a secure autonomic synchronization of the first data object with the second network device;

generating, by the secure executable container, a message object and adding a corresponding reference of the message object to the first data object; and updating, by the secure executable container, a hypercontent body in the message object with streaming media data received from an executable media source in the endpoint device, the updating including causing the second network device to retrieve each update of the streaming media data in the hypercontent body during the secure peer-to-peer streaming media session.

2. The method of claim 1, further comprising autonomically retrieving, by the secure executable container, second streaming media data generated by the second network entity based on detecting a second message object referenced in the first data object.

3. The method of claim 2, wherein the autonomically retrieving includes:
   detecting a corresponding reference to the second message object in the first data object in response to detecting a change in the first data object by the second network device;
   autonomically retrieving the second message object via the secure data network;
   extracting, from a corresponding hypercontent body in the second message object, the second streaming media data for delivery to the executable media source.

4. The method of claim 3, wherein the extracting includes retrieving each updated second streaming media data, from the corresponding hypercontent body in the second message object, in response to detecting a change in the second message object.

5. The method of claim 4, further comprising:
   establishing, by the secure executable container, a corresponding two-way trusted relationship between the endpoint device and a third network device of the second network entity;
   the autonomically retrieving includes retrieving each updated second streaming media data from the second network device to the third network device, based on detecting a corresponding change in the second message object by the third network device.

6. The method of claim 2, further comprising:
   generating a third message object, referenced in the first data object, that comprises call control metadata associated with call controls by the originating entity in the secure peer-to-peer media session;
   the autonomically retrieving including retrieving the second streaming media data from within the second message object, and retrieving second call controls by the second network entity from a fourth message object generated by the second network entity and referenced in the first data object.

7. The method of claim 6, wherein the updating includes:
   adding a session initiation notification to the hypercontent body upon initiation of the secure peer-to-peer streaming media session and a ring call control to the call control metadata of the third message object; and
   replacing the session initiation notification in the hypercontent body with the streaming media data in response to detecting, from the fourth message object, an answering indication in the second call controls.

8. The method of claim 2, wherein:
   the generating of the first data object includes identifying a third network entity as a corresponding participant in the secure peer-to-peer streaming media session, and causing a secure autonomic synchronization of the first data object with a third network device of the third network entity;
   the method further comprising autonomically retrieving, by the secure executable container, third streaming media data generated by the third network entity based on detecting a third message object referenced in the first data object.

9. The method of claim 8, wherein the secure executable container causes the originating entity to retain authority to control the secure peer-to-peer streaming media session, including selectively muting or dropping any one of the second network entity or the third network entity from the secure peer-to-peer streaming media session.

10. The method of claim 1, further comprising:
    generating a second message object referenced in the first data object, the second message object comprising call control metadata associated with call controls by the originating entity in the secure peer-to-peer streaming media session.

11. The method of claim 10, further comprising:
    detecting, by the secure executable container, a corresponding call status of the second network entity in response to detecting a third message object referenced in the first data object, autonomically retrieving the third message object, and determining the call status from the third message object.

12. The method of claim 11, wherein:
    the call control metadata specifies any one of a ring call control indicating initiation of the secure peer-to-peer streaming media session, a park/hold call control indicating suspension of the updating of the hypercontent body, or a resume call control indicating resumed updating of the hypercontent body;
    the call status of the second network entity identifying any one of an answer status, a park/hold status, a resume status, or a busy status, the third message object further identifying an active endpoint device identifier for an active endpoint device used by the second network entity for the secure peer-to-peer streaming media session.

13. One or more non-transitory tangible media encoded with logic for execution by a machine and when executed by the machine operable for:
    receiving, by a secure executable container executed by the machine as an endpoint device, a request by an originating entity for initiating a secure peer-to-peer streaming media session with at least a second network entity in a secure data network, the secure executable container having established a two-way trusted relationship between the originating entity and the endpoint device in the secure data network and a corresponding two-way trusted relationship between the endpoint device and a second network device of the second network entity;
    generating, by the secure executable container in response to the request, a first data object identifying the second network entity as a participant in the secure peer-to-peer streaming media session, and causing a secure autonomic synchronization of the first data object with the second network device;
    generating, by the secure executable container, a message object and adding a corresponding reference of the message object to the first data object; and
    updating, by the secure executable container, a hypercontent body in the message object with streaming media data received from an executable media source in the endpoint device, the updating including causing the second network device to retrieve each update of the streaming media data in the hypercontent body during the secure peer-to-peer streaming media session.

14. The one or more non-transitory tangible media of claim 13, further operable for autonomically retrieving, by the secure executable container, second streaming media data generated by the second network entity based on detecting a second message object referenced in the first data object.

15. The one or more non-transitory tangible media of claim 14, wherein the autonomically retrieving includes:
    detecting a corresponding reference to the second message object in the first data object in response to detecting a change in the first data object by the second network device;

autonomically retrieving the second message object via the secure data network;

extracting, from a corresponding hypercontent body in the second message object, the second streaming media data for delivery to the executable media source.

16. The one or more non-transitory tangible media of claim 14, further operable for:

generating a third message object, referenced in the first data object, that comprises call control metadata associated with call controls by the originating entity in the secure peer-to-peer media session;

the autonomically retrieving including retrieving the second streaming media data from within the second message object, and retrieving second call controls by the second network entity from a fourth message object generated by the second network entity and referenced in the first data object.

17. The one or more non-transitory tangible media of claim 13, further operable for:

generating a second message object referenced in the first data object, the second message object comprising call control metadata associated with call controls by the originating entity in the secure peer-to-peer streaming media session.

18. The one or more non-transitory tangible media of claim 17, further operable for:

detecting, by the secure executable container, a corresponding call status of the second network entity in response to detecting a third message object referenced in the first data object, autonomically retrieving the third message object, and determining the call status from the third message object.

19. The one or more non-transitory tangible media of claim 18, wherein:

the call control metadata specifies any one of a ring call control indicating initiation of the secure peer-to-peer streaming media session, a park/hold call control indicating suspension of the updating of the hypercontent body, or a resume call control indicating resumed updating of the hypercontent body;

the call status of the second network entity identifying any one of an answer status, a park/hold status, a resume status, or a busy status, the third message object further identifying an active endpoint device identifier for an active endpoint device used by the second network entity for the secure peer-to-peer streaming media session.

20. An apparatus implemented as a physical machine, the apparatus comprising:

non-transitory machine readable media configured for storing executable machine readable code;

a device interface circuit; and a processor circuit configured for executing the machine readable code as a secure executable container, and when executing the machine readable code operable for:

receiving, by the apparatus implemented as an endpoint device, a request by an originating entity for initiating a secure peer-to-peer streaming media session with at least a second network entity in a secure data network, the secure executable container having established a two-way trusted relationship between the originating entity and the endpoint device in the secure data network and a corresponding two-way trusted relationship between the endpoint device and a second network device of the second network entity, generating, in response to the request, a first data object identifying the second network entity as a participant in the secure peer-to-peer streaming media session, and causing via the device interface circuit a secure autonomic synchronization of the first data object with the second network device, generating a message object and adding a corresponding reference of the message object to the first data object, and updating a hypercontent body in the message object with streaming media data received from an executable media source in the endpoint device, the updating including causing the second network device to retrieve each update of the streaming media data in the hypercontent body during the secure peer-to-peer streaming media session.

* * * * *